United States Patent
Daniel et al.

(10) Patent No.: US 12,214,691 B2
(45) Date of Patent: Feb. 4, 2025

(54) SYSTEMS FOR MACHINE LEARNING, OPTIMIZING AND MANAGING LOCAL MULTI-ASSET FLEXIBILITY OF DISTRIBUTED ENERGY STORAGE RESOURCES

(71) Applicant: MOIXA ENERGY HOLDINGS LIMITED, London (GB)

(72) Inventors: Simon Richard Daniel, London (GB); Christopher Verity Wright, Surrey (GB)

(73) Assignee: Moixa Energy Holdings Limited (GB)

( * ) Notice: Subject to any disclaimer, the term of this patent is extended or adjusted under 35 U.S.C. 154(b) by 25 days.

(21) Appl. No.: 15/734,705

(22) PCT Filed: Jun. 20, 2019

(86) PCT No.: PCT/EP2019/066382
§ 371 (c)(1),
(2) Date: Dec. 3, 2020

(87) PCT Pub. No.: WO2019/243524
PCT Pub. Date: Dec. 26, 2019

(65) Prior Publication Data
US 2021/0221247 A1 Jul. 22, 2021

(30) Foreign Application Priority Data
Jun. 22, 2018 (GB) .................................. 1810314

(51) Int. Cl.
*B60L 53/68* (2019.01)
*B60L 53/67* (2019.01)
(Continued)

(52) U.S. Cl.
CPC ............... *B60L 53/68* (2019.02); *B60L 53/67* (2019.02); *G05B 15/02* (2013.01); *G06N 3/044* (2023.01);
(Continued)

(58) Field of Classification Search
CPC .......... B60L 53/68; B60L 53/67; B60L 55/00; G05B 15/02; G06N 3/0445; G06N 3/08;
(Continued)

(56) References Cited

U.S. PATENT DOCUMENTS

| 4,990,099 A | 2/1991 | Marin et al. |
| 7,108,560 B1 | 9/2006 | Chou et al. |

(Continued)

FOREIGN PATENT DOCUMENTS

| EP | 0409226 A2 | 1/1991 |
| EP | 1198056 A2 | 4/2002 |

(Continued)

OTHER PUBLICATIONS

International Patent Application No. PCT/EP2019/066382 International Search Report and Written Opinion dated Oct. 11, 2019 (20 pages).

(Continued)

*Primary Examiner* — Santosh R Poudel
(74) *Attorney, Agent, or Firm* — Van Pelt, Yi & James LLP

(57) ABSTRACT

Systems, devices and methods for optimising and managing distributed energy storage and flexibility resources on a localised and group aggregation basis, particularly around the determination, analysis and predictive learning of local data patterns, scoring availability for flexibility and risk profiles, to inform the optimisation of energy supply and behind the meter storage resources and local clusters of co-located or close resources within a community, low (Continued)

voltage network, feeder, neighbourhood or building. Said optimisation to involve scheduled, reactive and active management of data sources and local clusters of resources, for a range of goals such as price, energy supply, renewable leverage, asset value, constraint or risk management. Or where said optimisation achieves a local objective such as providing resources to off-set, aid local balancing or constraint management of larger local supplies and loads, or to aid active management of local energy demands and renewable supplies, storage resources, electric heat resources, electric vehicle charging resources or clusters of electric vehicle chargers, flexible loads in buildings.

20 Claims, 10 Drawing Sheets

(51) Int. Cl.
| | | |
|---|---|---|
| G05B 15/02 | (2006.01) | |
| G06N 3/044 | (2023.01) | |
| G06N 3/08 | (2023.01) | |
| H02J 3/14 | (2006.01) | |
| H02J 13/00 | (2006.01) | |

(52) U.S. Cl.
CPC .............. *G06N 3/08* (2013.01); *H02J 3/144* (2020.01); *H02J 13/00002* (2020.01)

(58) Field of Classification Search
CPC .. H02J 3/144; H02J 13/00002; H02J 2203/20; H02J 7/34; H02J 3/008; H02J 3/38; H02J 3/14; H02J 3/32; H02J 3/381; Y02B 70/3225; Y02E 40/70; Y02E 60/00; Y02T 10/70; Y02T 10/7072; Y02T 90/12; Y02T 90/16; Y02T 90/167; Y02T 90/168; Y02T 90/169; Y04S 10/50; Y04S 20/222; Y04S 30/12; Y04S 30/14; Y04S 40/20; Y04S 50/10

See application file for complete search history.

(56) References Cited

U.S. PATENT DOCUMENTS

| | | | |
|---|---|---|---|
| 7,877,338 B2* | 1/2011 | Tani ................ | G06N 3/045 |
| | | | 706/15 |
| 8,774,007 B2 | 7/2014 | Hussain | |
| 9,225,173 B2 | 12/2015 | Darden, II et al. | |
| 9,379,545 B2 | 6/2016 | Daniel et al. | |
| 10,069,300 B2 | 9/2018 | Lenox | |
| 10,218,177 B2 | 2/2019 | Kern | |
| 10,418,815 B2 | 9/2019 | Kern | |
| 10,530,157 B2 | 1/2020 | Kern | |
| 11,050,256 B2 | 6/2021 | Kern | |
| 11,460,490 B2 | 10/2022 | Lu | |
| 11,855,482 B2 | 12/2023 | Narla | |
| 2002/0163931 A1 | 11/2002 | Lee et al. | |
| 2003/0126060 A1 | 7/2003 | Lof et al. | |
| 2003/0142985 A1* | 7/2003 | Sampath ............ | G03G 15/5062 |
| | | | 399/9 |
| 2004/0117330 A1 | 6/2004 | Ehlers et al. | |
| 2007/0248877 A1 | 10/2007 | Qahoug et al. | |
| 2008/0039979 A1 | 2/2008 | Bridges et al. | |
| 2008/0039980 A1* | 2/2008 | Pollack ............. | B60L 53/68 |
| | | | 700/295 |
| 2008/0058996 A1 | 3/2008 | Sachdev et al. | |
| 2008/0140565 A1 | 6/2008 | DeBenedetti et al. | |
| 2008/0143290 A1 | 6/2008 | Chavakula | |
| 2008/0167756 A1 | 7/2008 | Golden et al. | |
| 2008/0185451 A1 | 8/2008 | Simon et al. | |
| 2009/0062967 A1* | 3/2009 | Kressner ............. | B60W 20/10 |
| | | | 700/286 |
| 2009/0066287 A1 | 3/2009 | Pollack et al. | |
| 2009/0189451 A1 | 7/2009 | Roepke | |
| 2009/0192655 A1 | 7/2009 | Ichikawa et al. | |
| 2009/0195349 A1 | 8/2009 | Frader-Thompson | |
| 2010/0026739 A1 | 2/2010 | Hirashima | |
| 2010/0076615 A1 | 3/2010 | Daniel et al. | |
| 2010/0076825 A1* | 3/2010 | Sato .................. | B60L 53/665 |
| | | | 705/14.1 |
| 2011/0016063 A1 | 1/2011 | Pollack et al. | |
| 2011/0276194 A1 | 11/2011 | Emalfarb et al. | |
| 2012/0005126 A1 | 1/2012 | Oh et al. | |
| 2012/0059527 A1 | 3/2012 | Beaston et al. | |
| 2012/0158327 A1 | 6/2012 | Hurri et al. | |
| 2012/0253531 A1* | 10/2012 | Tyagi ................. | G06Q 50/30 |
| | | | 700/291 |
| 2014/0159485 A1 | 6/2014 | Daniel et al. | |
| 2014/0176079 A1 | 6/2014 | Ito | |
| 2016/0082856 A1 | 3/2016 | Baxter et al. | |
| 2016/0280092 A1 | 9/2016 | Jefferies et al. | |
| 2016/0347195 A1 | 12/2016 | Bridges et al. | |
| 2016/0358070 A1* | 12/2016 | Brothers ............ | G06N 3/082 |
| 2017/0005474 A1 | 1/2017 | Sanders et al. | |
| 2017/0017213 A1 | 1/2017 | Miftakhov | |
| 2017/0373509 A1 | 12/2017 | Betzin et al. | |
| 2018/0086222 A1* | 3/2018 | Juang ................ | G06N 3/044 |
| 2018/0285696 A1* | 10/2018 | Eigen ................ | G06T 5/00 |
| 2019/0222045 A1* | 7/2019 | Dhanapal .......... | H02J 7/007194 |
| 2021/0221247 A1 | 7/2021 | Daniel | |

FOREIGN PATENT DOCUMENTS

| | | |
|---|---|---|
| EP | 1263108 A1 | 12/2002 |
| EP | 2453512 A1 | 5/2012 |
| EP | 2592686 A2 | 5/2013 |
| GB | 2408592 A | 6/2005 |
| GB | 2486016 A | 6/2012 |
| JP | 2005224009 A | 8/2005 |
| KR | 101491553 B1 | 2/2015 |
| KR | 101935684 | 1/2019 |
| WO | 01/06612 A1 | 1/2001 |
| WO | 02/21659 A1 | 3/2002 |
| WO | 2008/071995 A2 | 6/2008 |
| WO | 2008/073453 A1 | 6/2008 |
| WO | 2013/123988 A2 | 8/2013 |
| WO | 2014/019607 A1 | 2/2014 |
| WO | 2017/066431 A1 | 4/2017 |
| WO | 2018046105 | 3/2018 |

OTHER PUBLICATIONS

Aveklouris, Angelos et al., "A Stochastic Resource-Sharing Network for Electric Vehicle Charing," 2017 (13 pages).
Carvalho, Rui et al., "Critical behaviour in charging electric vehicles," New Journal of Physics, 2015 (12 pages).
Crisostomi, Emanuele et al., "Electric and Plug-in Hybrid Vehicle Networks: Optimization and Control," Boca Raton: CRC Press, Taylor & Francis Group, 2018 (264 pages).
United Kingdom Patent Application No. GB1810314.3 Combined Search and Examination Report dated Dec. 12, 2019 (6 pages).

* cited by examiner

SYSTEMS FOR MACHINE LEARNING, OPTIMIZING AND MANAGING LOCAL MULTI-ASSET FLEXIBILITY OF DISTRIBUTED ENERGY STORAGE RESOURCES

CROSS-REFERENCE TO RELATED APPLICATIONS

This application is a National Phase Entry into the U.S. under 35 U.S.C. § 371 of and claims priority to PCT Application No. PCT/EP2019/066382 filed Jun. 20, 2019, and entitled "Systems for Machine Learning, Optimising and Managing Local Multi-Asset Flexibility of Distributed Energy Storage Resources," which claims priority to GB1810314.3 filed on Jun. 22, 2018, the contents of each being incorporated herein by reference in their entirety for all purposes.

STATEMENT REGARDING FEDERALLY SPONSORED RESEARCH OR DEVELOPMENT

Not applicable.

FIELD OF THE INVENTION

The present invention relates to managing groups of distributed energy storage resources, such as batteries and electric vehicles, via machine learning and other optimisation approaches to aid electrical system balancing and local network constraint management, and to maximise performance across multiple energy system stakeholders.

BACKGROUND TO THE INVENTION

Energy storage represents a growing asset class in the energy system and opportunity to help manage and shift supply from low carbon generation resources such as wind and solar, and to help manage the shape of energy demand profiles, and electrical system management. The management challenge increases when large numbers of energy storage and flexibility resources are present on a grid, particularly with the rise in electric vehicle adoption and the increased pressure on local networks in accommodating large swings in power consumption—such as with increasingly higher rate electric vehicle charging.

The challenge is also increased when energy systems are 'islanded' or limited in connection, e.g. for large island nations, or locations/networks with few interconnection, or when planning new sites, whether for new building or campuses, or for new smart cities. UK and Japan for example are large island nations, with low (e.g. 10%) interconnection so have to manage flexibility within their own energy system as the swings from large scale deployment of distributed wind and solar resources result in changes over the solar day or with the weather. Similarly large scale adoption of distributed batteries, such as home storage, electric vehicles and personal mobility devices, robotics or growing Internet of Things/battery operated devices, requires significant charge management over the day.

In the UK for example an electrification strategy for mobility, could result in over a Terawatt (TWH) of batteries across UK transport that need to be managed and optimised on a daily and location basis. This creates significant infrastructure challenges, in investing in new generation and network resource, and also opportunities of vehicles aggregating power to help grids (e.g. U.S. Ser. No. 11/836,760 V2 Green Inc.).

There are a number of prior art examples (including from Moixa, U.S. Pat. No. 9,379,545, US20100076615) which discuss aspects of this challenge from the viewpoint of individual solutions (e.g. solar batteries at Moixa, Tesla, STEM, Sunverge, Sonnen), energy data collection and secure exchange (e.g. U.S. Ser. No. 13/328,952, KR101491553B1) or via ledgers (WO2017066431A1) or for solutions on EV management (US20080039979A1), or rate arbitrage between on or off peaks (e.g. U.S. Pat. No. 9,225,173 on co-ordinating storage resources as emergency power on a micro-grid and in response to market price) and aggregate applications for virtual power plants (e.g. U.S. Ser. No. 15/540,781, US20170005474A1).

There are also various academic papers modelling challenges of Electric Vehicle management and charging, including "A Stochastic Resource-Sharing Network for Electric Vehicle Charging", Angelos Aveklouris et al, 2017 (https://arxiv.org/abs/1711.05561), "Critical behaviour in charging of electric vehicles", Rui Carvalho, Frank Kelly et al (2015, New J. Phys. 17 (2015) 095001), "Electric and Plug-in Hybrid Vehicle Networks: Optimization and Control", (November/2017, ISBN 9781498744997), Emanuele Crisostomi/Bob Shorten et al, which outline mathematical optimisation problems in electric vehicle flows and charging.

However, such and other examples do not properly consider how multiple types of assets and interests need to be managed on a group and local level, and optimised to achieve a balance between, individual motives and benefits (e.g. the home owner) or EV user, or regulated entities (such as suppliers or networks), or device manufacturers. In particular they do not present how technologies need to be combined to offer solutions that are adaptive to different energy systems and regulations or changes in billing and approach over time, or in how machine learning and other optimisation technologies can combine to deliver real-time and self-regulating control of groups of assets in a location. Neither do the prior approaches properly address how such groups can be managed reliably over time, with technologies that are resilient over time and a changing energy, communication and software environment, nor do prior approaches address how to manage such assets financially, such as cash-flow payments from counter-parties or contracts, to maximise returns to stakeholders or asset funders. Nor do prior approaches properly address how to minimise life-time operations and maintenance costs, in maintaining connectivity and managing and updating fleets of distributed assets over time.

In view of these challenges and issues, there is therefore a need for systems, methods and devices that can collectively address these and other problems in the energy system, and enable groups of different types of batteries or devices with batteries to be managed as collective assets as energy infrastructure.

SUMMARY AND DESCRIPTION OF THE INVENTION

According to aspects of embodiments of the invention, a management and optimisation system is provided, comprising software systems and protocols, connectivity and exchange means to and between end devices and resources, to gather data and monitor usage, process external data and market signals, and perform algorithms that analyse and identify characteristics and update predictions, in order to co-ordinate how flexibility in said resources, can be scheduled, shared or orchestrated to enable various interventions of individual or aggregate groups of resources, to achieve certain goals or reliable performance objectives over time, for an individual site, local environment, wider community or nation.

Said end resources typically include distributed energy storage resources, such as "behind the meter" electrical storage batteries or heat storage sources, co-located or centralised larger battery resources, electric vehicles or their charger apparatus, other devices with embedded batteries such as drones, telecom masts, robotics, end customer devices, Internet of Things (IoT) and consumer electronic devices that require periodic charging and management, or distributed energy generation sources such as solar panels, wind resources, fuel cells, waste to energy, or energy loads or appliances that can act as a flexible resource by shifting consumption, e.g. mechanical, heating or cooling elements.

Said end devices typically include physical apparatus co-located with resources such as smart meters, clamps and sensors, routers and controllers, smart hubs and gateways, communication apparatus, consumer access devices and displays, charger apparatus or smart plugs or control actuators, processing chips or circuitry connected to end resources, or as sensors or other devices ostensibly performing an alternate function such as smart speakers, smart thermostats, smart phones, or methods of determining or extracting data from third-party sources such as GPS signals, traffic cameras, remote imagery (such as of weather patterns or solar availability for roof areas).

An example embodiment would be to use said devices, to provide real-time data on energy supply or usage or needs of said resources across a location or low voltage network, to algorithms or a 'brain' software system, e.g. in the cloud or at a central server, or on end devices and resources, to calculate a current position and next predicted position or forward profile of resources to aid with an intervention, such as managing the rate of charging of distributed energy resources at such as a plurality of batteries or electric vehicles.

Said connectivity means typically include standard communication technologies such as fixed and wireless telephony and mobile networks (GPRS, 1-5G, LTE), local communication technologies such as WiFi, Z-Wave, Zigbee, mesh networks, Powerline or signals carried over an electrical circuit, together with leverage of the Internet and remote servers, and cloud hosted components and technologies, and on end customer devices.

Said software systems may be aided by suitable protocols which act as distributed control means, standards, frameworks and APIs, and mechanisms for self-regulating large volumes of distributed entities to achieve a collective objective or benefit. For example, a charging protocol on distributed resources may be configured to respond to a local constraint, congestion or local limit, to optimise flow (e.g. energy or data) at a local position, in such a manner as the aggregate stochastic and network performance is predictable and beneficial. As an example it has been found particularly advantageous to use approaches from telephony to inform energy control, such as TCP (Transmission Control Protocol) where bandwidth was managed by enabling distributed resources to self-regulate and manage bandwidth (TCPIP) flows as local congestion was observed (Jacobson 1988). In a similar manner, an object of the invention is to use a combination of central software systems and protocols to help govern at a distributed level how an overall energy system performs, and aid for example local voltage limits, local and overall system balancing. This has been remarkably effective in bandwidth management where in effect a decentralised system of 'routing' stochastically to local constraints, achieves an overall optima—in effect as a decentralised parallel algorithm that achieves and solves an optimisation problem (Kelly).

In the same way such charging protocols may help govern a goal of the software system, by ensuring that distributed resources such as batteries or electric vehicle charger rates, initially respond to local constraints in a predictable fashion and in a manner which favours a preferred aggregate behaviour, and where such charging protocols might act to maximize e.g. 'power flow' or capacity at certain sites or maximise proportional fairness to balance resources and access more equitably, such as access to charging at low price or access and suitable fair distribution in rates of charge when energy networks are congested, and suitable management or 'throttling' to actively manage the charge rates to optimise participant demands within constraints of a system.

In a similar manner, in an example embodiment, such approaches may be applied to charging algorithms or scheduled charge plans for a battery asset, that seeks to achieve a profile and then makes dynamic or periodic adjustments based on processing signals (e.g. market and tariff signals, weather data, location constraints) together with local measurements of energy supply (e.g. from grid or solar resources) and energy use by the building or vehicle. Said system in aggregate has an effect of self-regulating and reducing uncertainty and volatility by delivering distributed corrections that re-inforce a target profile or price goal. In an electricity market such as the UK, whilst each household tends to have a volatile profile of energy use, a large aggregate of households tends to follow a predictable pattern, and are indeed settled on the basis of the average aggregate profile, such as an Elexon profile for the house category, for a period, or a day. As markets move to more time of day, real-time as well as local settlement, for example as the UK rolls out half-hourly settlement periods to households, and not just larger sites and businesses, the management and self-regulation of distributed assets will become more critical for both pricing, arbitrage opportunities as well as system balancing, and for Energy suppliers to more accurately forecast, trade and correct energy purchase and imbalance costs.

Said data and usage analysis, may typically include measurement of energy use on a mains (Grid supply), on household or building circuits, on appliances or large loads, electric vehicles and charge apparatus, energy supplies such as solar, wind, fuel-cell or other resources. Wherein measurement of energy may include analysis or NILM (non-intrusive load monitoring) of changes in voltages, power and reactive power, frequency and phase, as well as measurement over time to detect changes and infer nature of loads, appliances in use, or detect potential faults, by usual methods (such as cluster analysis, disaggregation, pattern recognition, modelling and convolution and comparison, harmonic based analysis, power spectral analysis) or complemented with additional data sources, context, and fusion analysis with other data and neural network approaches (e.g. Moixa US20100076615). Said data may also include other properties or data such as GPS locations, to enable geo-fencing or informing patterns of related behaviour (e.g. arrival, temperature requirements, EV charging likelihood), calendar data for reference to typical behaviour (for that day or weekend, or month, holiday), local data on generation outputs and demand data (building, EV chargers), market flexibility needs at e.g. a network level such as voltage rise, drop and quality issues, wider market needs on frequency movements, market signals on price such as wholesale and retail or rates offered by suppliers, price forward profiles or next day ahead market trading data, or data on imbalance and contract issues, data on market intervention needs such as Demand Side Management Response (DSR/DSM), data impacting activity such as temperature and weather data and forecasts, as well as local information such as site related data on occupancy patterns, $CO_2$ levels, sound, WIFI usage and device connectivity/presence, community data and P2P (Peer To Peer) resource availability or needs, or other external data such as requests or data exchange with energy system—energy suppliers and billing accounts, market functions such as DCC, Elexon, local DSO markets, TSO/national grid alerts.

Within said management and optimisation system, said exchange means, typically can include data or packets, standards, APIs and various tools that can aid access, security or help mediate a transaction, such as software approaches that aid authenticated access to resources, such as tokens, hash records and time-stamps, smart contracts, private and public keys, digital signatures, distributed ledgers and audit records, blockchains or parachains, electronic 'coins' or other cryptographic representations that can reliably maintain said access and transaction control over term.

Said exchange and tools may also be platforms or marketplaces, or management and financial structures, such as a special purpose vehicle (SPV), which may use the management and optimisation system, to help goals of managing assets and contracts over time, and help ensure objectives and performance—such as benefits, cash-flows by managing resources for different purposes over term, and to use the system to manage operational and maintenance (O&M) areas over the life of assets.

In an example embodiment of said management and optimisation system, a method would seek to orchestrate and manage distributed energy resource assets on an individual and aggregate basis to deliver an optimal return for such assets and their owners (customers or asset vehicles) as an "Energy as a Service" (EaaS) model or as a battery operator 'BOP' by providing flexibility and services across a spectrum of potential beneficiaries, from BTM—"Behind the Meter", typically for end customers or buildings, ATM—"At the Meter", typically for energy suppliers or energy service companies, LTM—"Local to Meter", typically for local distribution networks, developers or communities, FTM—"Front of the Meter", for wider grid actors and system benefits. Said optimisation method typically involves optimising for a single or co-operating cluster of beneficiaries, and learning energy patterns and managing flexibility to maximise income on a daily basis, and deliver extra return by making flexibility available on demand via contracts with certain parties for when certain situations arise, such as local network constraints or high value opportunities on the electricity grid.

Within such an approach, an optimisation and orchestration method may seek to manage a pure BTM—in home/building customer benefit, or to align objectives between, say, a Utility supplying the customer (BTM+ATM) or across a local group of customers as peers (in a peer to peer model) or as a group (BTM+ATM+LTM) such as houses and EV customers, Utility suppliers and local network. In such a situation algorithms need to consider 1) the data and identity characteristics and manage according to goals such as a) local limits on the network that may act as constraints on supply or timing and rates of charging, or b) limit export of energy from renewable or battery/EV resources, and 2) constraint scoring (e.g. risk of the power network not having enough capacity to meet demand) and 3) prediction of shiftable demand or flexibility in homes or vehicles and 4) risk scoring of the flexibility and predictability of the resource to account for where it may be limited e.g. by forecast energy demand needs, the size and availability of battery resources, knowledge of occupancy or non-occupancy of building, location of an electric vehicle (e.g. if not connected), or contract or market constraints, e.g. where an energy supplier may not wish to provide flexibility if it impacts their trading position or where flexibility may be desired for a wider grid issue or contract opportunity.

In an embodiment, the system comprises:
a central software system arranged to receive data and monitor usage of end devices and resources at plural remote sites in a network, the software system being arranged to determine a battery charging plan for charging and/or discharging batteries at the remote sites, where the batteries are Electric Vehicle (EV) batteries and/or other energy storage batteries;
end devices at remote sites arranged to control charging in accordance with their respective charging plans, wherein the end devices implement a charging protocol configured to respond to an identified local constraint, congestion or local limit, to optimise energy transmission on the local network, in such a manner as the aggregate stochastic and network performance is predictable and beneficial.

Thus, as discussed above, using such protocols at charging points distribute a decision to vary charging rate, based on measurement of a local property, such as voltage changes, limits, or frequency, so as to proportionally delay charging or reduce charging rates in stress or high load events, or to gradually increase charging rates on measurement of low load or low stress events, and so to self-regulate in a predictable fashion how a charging event behaves. The combination of central software systems and distributed protocols thus governs how an overall energy system performs, and aids for example local voltage limits, local and overall system balancing. This negates the complexity of a purely top down approach.

In an embodiment, the charging protocol proceeds by:
a) beginning charging or discharging at an initial rate;
b) periodically incrementing the rate towards a target rate according to the charging plan for the rechargeable battery;
c) detecting an indication of a local limit being reached on the network and in response reducing the rate,
and continuing steps b and c to charge and/or discharge the battery according to the plan.

The increments to the charging rate may additive, and the reductions to the charging rate may be multiplicative. Thus the charging rate approaches the target rate in increments, whereas, where congestion is detected, the charging rate is backed off at an exponential rate until the congestion event has passed. This provides self-regulation and stability to the network.

In an embodiment, the indication of a local limit being reached on the network is determined by monitoring a voltage level or frequency on the distribution network or a change in voltage level or frequency, where the limit can be an upper or lower limit for the network to operate within predetermined acceptable conditions. Thus, the scheme can be applied to both charging a battery from the local network, where a high voltage level can indicate the network is stressed, or discharging a battery into the network where a low voltage level is detected, indicating that there is insufficient supply.

In an embodiment, the aggregate of distributed charging profiles or device charge plans responding in a predictable fashion, provides a distributed self-regulation effect to aid the overall predictability, fairness, stability or goal of the system.

In an embodiment, the charging plan is dynamically adjusted based on processing signals indicative of one or more of:

market and tariff signals, weather data, location constraints
local measurements of energy supply
energy use by the building or vehicle.

In an embodiment, the system is arranged to perform a method of actively managing and throttling rates of electric vehicle charging across a site or local, low voltage network in accordance with local constraints, comprising:

monitoring end electric vehicle (EV) status and battery charging status at remote sites;
predicting forward use and charging patterns of electric vehicles at remote sites, and predicting local network performance;
forming an aggregate model of EV use and network performance across a local network using such measurements and forward predictions, and comparing the aggregate model of EV use and network performance to identify a potential issue on a local network where predicted use would exceed the local constraint;
decision logic to evaluate and schedule a real time adjustment to an EV charging plan to throttle charge rates avoid exceeding the local constraint;
communicating the adjusted charging plan to the remote EVs.

In an embodiment, the local constraint is a consumer and utility supply constraint in time shifting energy use and/or coupled with local network constraints of managing a set of resources within a local network to avoid constraints imposed by the infrastructure of the local network. Thus, for example, the existing local network may not have the capacity to support a new facility for recharging multiple Electric Vehicles, where peak use can be expected to exceed capacity. By allowing the system to actively manage the charging points, the power drawn can be throttled, such that the facility can operate within the local constraints of the network, thus avoiding expensive upgrading of the infrastructure. Clearly, different local constraints can operate on different part of the network, and the system can throttle different end sites at different rates according to the respective identified local constraints.

In an embodiment, available flexibility and risk profiles from end site resources are used to defer charging.

In an embodiment, the prediction is based at least in part on tracking EV vehicle location. Thus, for example, proximity of the electric vehicle to its base charging station can be used to predict that a charging event will occur in an imminent time period.

In an embodiment, the system is arranged to optimise behind-the-meter (BTM) benefits by the management and optimisation system, where the system processes real-time or periodic data from end devices to manage flexibility delivered by charging/discharging distributed energy storage resources by:

a) analysing data sources including one or more of i) energy use, ii) local solar production, iii) weather forecast data iv) calendar information, past performance and learnt behaviour v) tariff profile information vi) customer preferences, and b) perform algorithmic approaches to make data-driven predictions of energy use including one or more of i) predicted load ii) solar generation iii) EV charge usage iv) battery charge plan v) risk profiles and flexibility c) using the data driven predictions to produce a charge plan for a storage resource to produce a desired goal.

In an embodiment, the goal is one or more of i) minimising energy use from the grid ii) maximising self-consumption of solar resources iii) minimising price iv) minimising $CO_2$ v) optimising battery performance, vi) managing state of charge and battery performance vii) achieving a charging goal for battery readiness at a certain time, viii) responding to a change request or flexibility opportunity from a third party, ix) providing capacity to respond to flexibility opportunities.

In an embodiment, the system is arranged to provide status and performance reporting to a user based on the data and predictions.

Predictions may make use of machine learning, pattern recognition and feature and event detection (e.g. of a high load, occupancy event, start of a charge cycle), training of neural networks to aid recognition of patterns or classifying patterns that are unusual, use of modelling, convolution and comparison, forecasting and probabilistic modelling (e.g. of energy load profiles on event detection, solar profiles, EV charge patterns), or Markov modelling to model probabilistic transitions and paths between likely subsequent states and duration of energy devices in use, or transition states in EV charging, feedback networks, predictive learning, linear programming.

Said event detection and short term forecast may make use of simple multi-layer perceptron or recurrent neural network, or disaggregation or profile information to determine and focus on events that have a prolonged impact on a forward profile, such as detecting the start of a high-load appliance such as a cooker, air-conditioner or washing machine, by detecting substantial step change in energy use, and disaggregation and pattern recognition approaches, such as referring to past profiles and learnt behaviour. This has been found to be particularly advantageous for informing forward predictions for such high-loads, or standard electric vehicle charging events, as well as rises in consumption triggered by occupancy (e.g. detection of return to work, away—e.g. holiday modes, night time slow down), and various tools such as risk-profiles can lend weight to the stability of such forecasts and past reliability to inform energy management and how predictions are used for trading, battery charge plan adjustments, wider flexibility availability.

In an embodiment, the system is arranged to use linear programming techniques between a set of data and variables at a start of a time interval, and a predicted set at a further time period to focus an optimisation between maximising a goal within the time interval and how by varying a battery charge rate/discharge parameter in a household battery or electric vehicle charging plan, a local optimisation could occur for the predicted time interval.

In an embodiment, the system is arranged to use neural networks, maximising an entropy function and/or finding Nash equilibrium approaches to optimising a goal and/or balance conflicting demands within a specific time interval.

In an embodiment, data is shared with a prediction engine and an economic model to determine a charging plan for a battery,
wherein said economic model calculates an impact of the example plan with reference to a tariff model or store; and the prediction engine i) calculates a forward model of consumption and generation for applying such a plan, and ii) stores the prediction to enable performance monitoring and feedback to the system or requests for new predictions if there is divergence of measured variables from the forecast, and iii) manages the storage and deployment of the plan to ensure end assets perform in accordance with the plan objectives.

In an embodiment, the system processes real-time or periodic data across a plurality of end devices within a particular location to manage an aggregate performance of energy storage resources within at least one identified local constraint, wherein the system is arranged to:
monitor multiple end site devices and resources for usage, supply and charging rate and receive prediction forecasts, risk profiles and available flexibility and spare capacity from end sites and on the local network;
aggregating site usage and forecasts to model the predicted overall load forecast, demand and flows across the location or low voltage network, analysing how such forecasts could impact local network performance in view of at least one network constraint, making or scheduling adjustments to local active management plans, central or distributed battery resources and EV charging, solar curtailment, heat-resources, and other demand side response assets in order that energy usage in the network meets the constraint; and enacting active management controls to implement the plans.

In an embodiment, the network constraint is one or more of:
i) power quality issues, such as voltage rise or drop, limits on different phases, network faults, power quality issues, and
ii) deployment of an additional loads or generation means on the network, such as electric vehicle charging, heat-pumps, electrification of heating, solar/EV export to grid, leading to assets running at higher stresses or increasing fault rate and increasing the challenge of managing the grid.

In an embodiment, the system is arranged to deliver flexibility, wherein individual assets can report their monitored status, generated charge plans, predictions, to a flexibility engine, which can turn a flex request for availability of delivery of flexibility to a market, into a constraint and adjustment to a plan, and model and calculate the cost, risk and recovery by applying such a constraint to a plan, in order to validate whether it can be assigned and aggregated into a group for dispatch to deliver such flexibility to a flex request, and to enact and manage performance of the delivery of such flexibility across a group, including managing the order, delivery, reporting and allocating reward from such performance.

According to an aspect of the present invention, there is provided a method of management and optimisation in an energy network comprising software systems and protocols, connectivity and exchange means to and between distributed end devices and energy resources, the method comprising:
gathering data and monitoring usage,
processing external data and market signals,
performing algorithms that analyse and identify characteristics and update predictions of energy usage, in order to co-ordinate how flexibility in said resources, can be scheduled, shared or orchestrated to enable various interventions of individual or aggregate groups of resources, can achieve certain goals or reliable performance objectives over term, for an individual site, local environment, wider community or nation.

According to an aspect of the present invention, there is provided a system for classification of events or behaviours observed in energy usage in an energy system, comprising:
a recurrent neural network arranged to receive at an input a time series of measurements indicative of energy usage or activity in the energy system and to identify based on the input
1) a time or occupancy dependent mode of use of the energy system or
2) a high load, long duration event, indicative of use of a particular appliance, disaggregated from the measurements,
and to output a scaler real-time value representing one or more properties associated with the mode of use or event, being one or more of the device or mode type, start-time of the event or mode, time and power load duration expectation;
a prediction engine arranged to calculate a prediction of load or flexibility in the energy system over a time period and/or a risk profile of the prediction based at least in part on the scalar value.

The system can be combined with other aspects and embodiments of the invention where prediction of energy usage at an end site is used.

In an embodiment, the mode of use is a seasonal or calendar related pattern, arrival, night-time slow-down, holiday.

In an embodiment, the event represents an EV charging, operation of wet-goods appliance or heat-appliance or cooling appliance.

In an embodiment, dedicated neural networks are provided for a plurality of target appliances and/or modes.

In an embodiment, a primary network dynamically branches to a further neural network arranged to:
create and re-inforce and train a network when measurement of a pattern is within range of an output threshold of a primary network,
and then decide to:
undertake a 'forward-pass' classification in a series of adjacent networks
or selectively learn and undertake a 'backwards-pass' update of weights within the network, when a network match is found.

According to an aspect of the present invention, there is provided a method of classification of events or behaviours observed in energy usage in an energy system, comprising:
receiving at the input of a recurrent neural network arranged a time series of measurements indicative of energy usage or activity in the energy system and to identify based on the input
1) a time or occupancy dependent mode of use of the energy system or
2) a high load, long duration event, indicative of use of a particular appliance, disaggregated from the measurements,
outputting a scaler real-time value representing one or more properties associated with the mode of use or event, being one or more of the device or mode type, start-time of the event or mode, time and power load duration expectation;
a prediction engine arranged to calculate a prediction of load or flexibility in the energy system over a time period and/or a risk profile of the prediction based at least in part on the scalar value.

According to an aspect of the present invention, there is provided a method of recording energy charging events in a mesh-chain in a system comprising a plurality of geographically distributed, metered charging points and a plurality of rechargeable batteries having associated logic incorporated in the batteries or in mobile devices incorporating the batteries, the method comprising:

storing a local ledger at the charging points and or the battery logic;

detecting a charging event associated with a rechargeable battery being connected to a charging point for metered charging or discharging;

forming a hash value of the event details from a credential associated with the rechargeable battery and a credential associated with the charging point;

updating the ledger at the charging point and or the battery logic with the hash value and a timestamp of the event.

In an embodiment, the credentials are shared public and private key between the charging point and the battery.

In an embodiment, the hash comprises a cryptographic hash of the previous event in the ledger to form a cryptographically linked chain of events at each node.

In an embodiment, the hash includes a local geolocational reference.

In an embodiment, the geolocational reference comprise a measured Wi-Fi signal identifier, identifier from a cell phone tower, GPS signal, or signature locally incorporated into a powerline transmission.

In an embodiment, the rechargeable batteries are comprised in electric vehicles.

In an embodiment, the method comprising accounting of use of the battery, or monetization of power received or delivered by the battery, or sharing assets in a peer to peer model.

In an embodiment, the method comprising checking authenticity of an event by checking the integrity of a chain and or by checking a charging event seen in a ledger at a battery has a matching entry in the ledger at the indicated charging point with a matching time stamp.

According to an aspect of the present invention, there is provided a system for carrying out the method described above, comprising a plurality of charging point or meters and a plurality of electric vehicles arranged to store local ledgers and arranged such to form hash values to be stored in the local ledgers upon detection of a charging event.

According to an aspect of the present invention, there is provided a computer program for carrying out the method of any previous claim.

According to different aspects of the present invention there are provided a method of optimising behind-the-meter (BTM) benefits by the management and optimisation system, where the system processes real-time or periodic data from end devices to manage distributed energy storage resources to inform and manage charging or trading; a method of optimising "Behind-the-Meter" (BTM) and Utility supply "At-the-Meter" benefits by the management and optimisation system, where the system processes real-time or periodic data from end devices to manage distributed energy storage resources to help inform and manage the overall energy shape of the trading and supply of energy by managing and adjusting charging; a method of optimising a group of "Behind-the-Meter" (BTM) and Utility supply "At-the-Meter" requirements alongside Local-to-Meter (LTM) benefits by the management and optimisation system, where the system processes real-time or periodic data across a plurality of end devices within the location to inform software systems to manage an aggregate performance of energy storage resources within local constraints; and a method of optimising a group of resources across BTM, ATM, LTM and FTM front-of-meter benefits by the management and optimisation system, where the system processes real-time or periodic data across a plurality of end devices to achieve their objectives whilst calculating or optimising spare capacity to participate in other flexible markets.

Within embodiments of a management and optimisation system, said software systems and protocols, may make use of mechanisms of exchange, based around distributed ledgers, such as block-chain technologies, electronic coins or cryptography, such as energy block-chains based on the EnergyWeb approaches (themselves based on Ethereum approaches). Such approaches, whilst negating the need for an intermediary, typically require significant processing power and chains that become unwieldy. Therefore they often require a party to act as a trusted validator to confirm a trade or verify 'proof of work', or para-chain approaches such as in the Polkadot variation of splitting transactions into groups or sub-chains. Such approaches may have value in how they enable consistent and mathematically pure and long-lasting approaches for data to be exchanged, and for new forms of protocols that are independent of energy system actor, device and language, so have value within software systems described in this application as mechanisms to ensure reliable access and management over time. However, while such approaches are interesting in creating new models of grid-edge or peer-to-peer marketplace, other approaches may be beneficial for creating such local marketplaces.

Of relevance within embodiments of the present invention, and exchange means, is where such ledger approaches are used to help govern interactions for assets within a close community, building, site, community or low voltage network. Within these approaches, a para-chain model can be used where part of the local energy system, such as a substation or special meter, can be used for confirmation and validation of local transactions, negating the energy and data intensive issues with full distributed block-chains. An approach is also to use what we term 'mesh-chains', where ledgers or block-chains are created at stable nodes, representing an assumed level of trust, such as by smart meters, charger points, at particular locations, as well as within assets such as electric vehicles, each time they cross-over or interact with another ledger, thus each creating an audit trail of each transaction that has metered energy flow for, charge event by a charger, charge/discharge by a vehicle, with each transaction creating a shared hash and timestamp noting its interaction within the grid. Within such an approach a 'false' ledger would be visible by not having significant tagged events with trusted or real nodes and chargers, and could be checked for authenticity on concern by calling up and checking with ledgers at particular nodes. Such approaches whilst not trying to create a digital currency can enable assets to transact and act as audit trails or use ledgers, to inform monetisation or compensation eligible by shared assets in peer to peer models, or for sharing resources, without creating the overheads and complexity of a perfect coin system (See for example FIG. 10B).

In an example embodiment, various devices within a local environment each has its own recorded chain or ledger of transactions, each recording each interaction with another device or chain, e.g. a charger and an electric vehicle, or a meter recording each interval of power consumed or exported. Wherein a transaction involves creating a message that is appended to both chains in the transaction, and realised with a suitable hash function, to combine signatures from both parties and chains in the transaction at a timestamp, such that signing respective hashes provides a proof record that parties undertook the transaction at that time. Wherein signing could be realised with a system of private and public keys (e.g. OpenPGP), and a key server sharing suitable authority. Wherein a local network a DNO or DSO might act as an authority, with respect to allowing load or generation on its network, to act as a key server, releasing keys for authorised assets or for assets subject to active management controls and rules. Similarly a smart meter, e.g. with an authorised MPAN might provide a suitable 'location stamp' and key.

A further example and embodiment, is where distributed ledger approaches are used to create and manage a smart contract between parties or form a shareable coin to mediate e.g. how KWh's of solar generation, Battery capacity, or local flexibility is shared on either a local ledger basis— where a trusted party is an asset such as a meter/charger/network node, within a location, that is included as a location-stamp within a hash of a time-stamp and transaction between parties. Such approaches are particularly advantageous where asset use has depreciation costs attached to it, such as in a stationary battery resource or electric vehicle, where 'coins' could record the asset depreciation and carbon cost, as well as cost and ownership of energy into the asset, in order to correctly account value for any net use, export or sharing of energy from the resource.

A further example and embodiment, is where a ledger, smart contract or transaction record such as a coin, is used to monetise or acknowledge value in energy data and forecast prediction itself, given the algorithmic calculation and prediction of energy use itself helps deliver or release value in trading by a counterparty (such as a supplier, or of a local peer resource benefiting or using, or of a battery or flexible asset receiving or providing a service).

Within a preferred embodiment of the management and optimisation system, a method is provided to help manage sets of distributed assets over time by using such exchange mechanisms together with standards for data, API's and use of open frameworks. The software system may further aid this method to help operations and maintenance of end resources by providing sets of tools, dashboards and monitors to alert operators, and aid end users in managing and updating settings, or requesting changes to contract management or system use over time. Said software system may also facilitate over the air updates, via the connectivity means, and use AI and machine learning to aid managing resources by pre-emptively identifying potential faults, or using error codes and alerts to set systems for analysis. Within finite resources such as batteries with limited cycle length, such mechanisms can also help identify when to replace assets, or upgrade opportunities where new or lower cost batteries could be added to improve performance.

A further feature of a preferred embodiments is where a financing vehicle of special purpose vehicle is established to own sets of distributed energy storage assets, EV charge apparatus or electric vehicles, where said vehicle contracts the management and optimisation system to perform certain functions over a term or for the life-of-the assets, such as aforementioned operations and maintenance tools, or managing and optimising services for BTM, ATM, LTM, FTM beneficiaries, or maximising income opportunities and contracted revenue or payments from such parties, such as may occur in Energy As A Service (EaaS) models or Transport As A Service (TaaS) models, where assets are rented or paid for on a per use basis, or as a service. The management and optimisation system is particularly advantageous in using data, predictions and optimisation methods to deliver service across a wide range of beneficiaries, thereby being more adaptive in time (or portable to other geographies) and reduce risk of income diversity as rules, regulations or behaviours in the marketplace change, or as volatility increases in energy networks in response to greater adoption of renewable energy generation such as solar and wind that vary over the day, and with greater adoption of electric vehicles and fast chargers that create increasing pressure or clustering of charge events on energy networks and at locations.

Whilst aspects of the innovation and above description of embodiments is given by way of example only, and by reference to figures and diagrams forthwith, it will be appreciated that various aspects and embodiments can be modified in accordance with other aspects and embodiments. The scope of the invention is not to be limited by details of the embodiments but is capable of numerous modifications within the scope of the invention as defined in the accompanying claims.

DETAILED DESCRIPTION WITH REFERENCE TO FIGURES

Preferred embodiments of the invention will now be described in detail with reference to the accompanying drawings.

Figure 1:
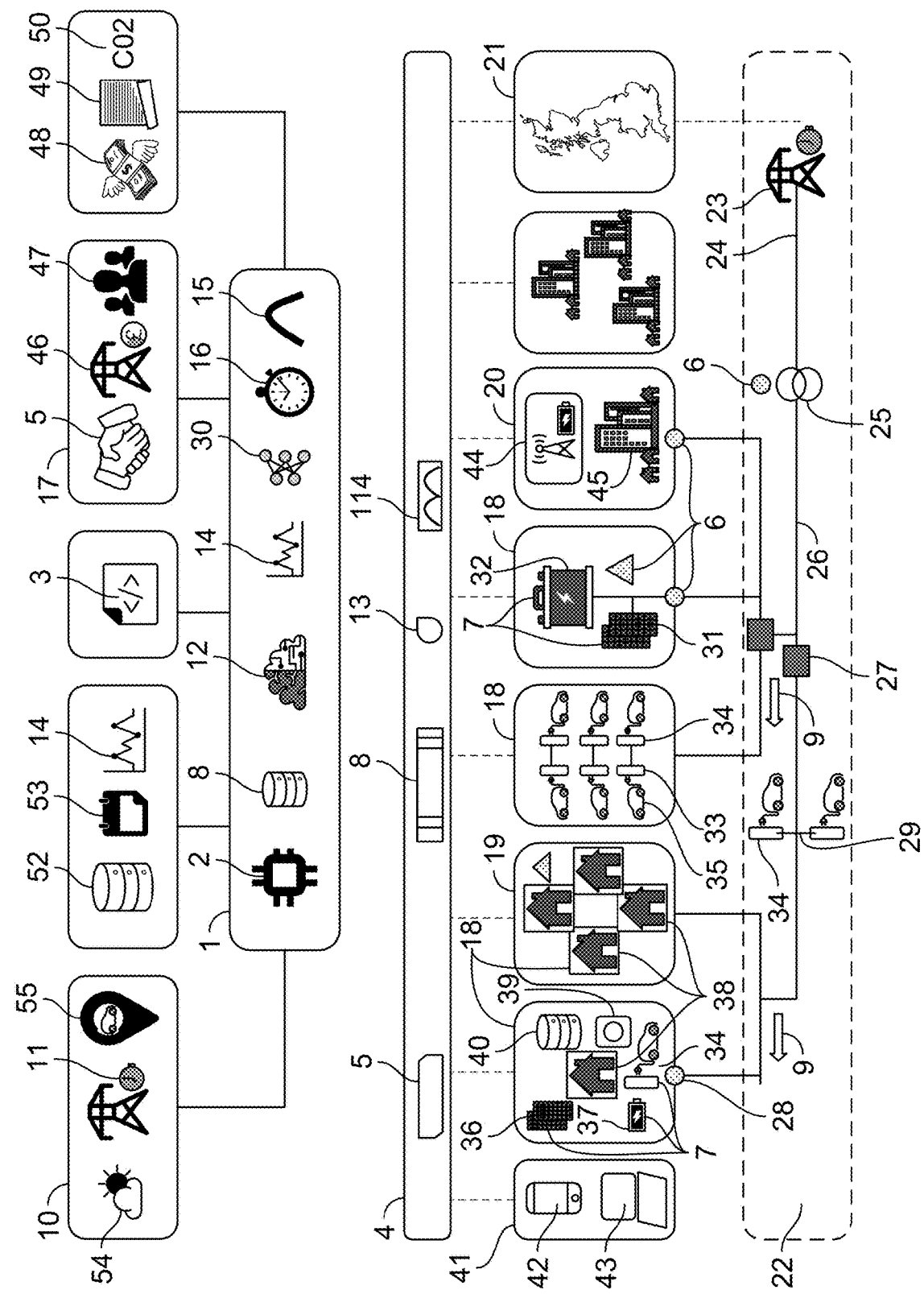
FIG. 1—an overview schematic of a management and optimising system, with software systems and various data inputs, exchange means and resources, connectivity layer to resources across end household sites with a variety of assets, multiple home sites, electric vehicle charging sites, central large battery or solar resources, larger buildings and sites, cities, and wider nation, on a local or wider electrical network.

Referring to FIG. 1, which shows a high-level schematic of a management and optimisation system 1, comprising software systems 2 and protocols 3, connectivity 4 and exchange 5 means for linking the software system to and between end devices 6 and resources 7 at various end sites 18 in the energy distribution system 22. The software gathers data 8 and monitor usage 9 of end devices 6 and resources, as well as processing external data 10 such as market signals 11, weather forecasts 54, and location presence 55. The software performs algorithms 12 e.g. AI & neural network 30 approaches that analyse and identify characteristics and/or events 13 from the data 8 and monitored usage 9 and, based on this, creates/updates predictions 14 of energy use in upcoming time periods and stores learnings 52 and calendar patterns 53 relating to insights into energy usage at the end sites. These predictions 14, learnings 52 and calendar patterns 53 are used in order to co-ordinate how flexibility 15 in said resources, can be scheduled 16, shared 17 or orchestrated to enable various interventions of individual or aggregate groups of resources 7, to achieve certain goals or reliable performance objectives over time, for an individual site 18, local environment 19, wider community 20, or nation 21.

Flexibility is the ability to provide resources that can increase or decrease demand, store or provide power to aid the energy network in managing variability and volatility and balance supply and demand on the network. Traditionally this was done by the energy suppliers bringing new generation resources on line to meet increases in demand. Increasingly, efforts now focus on demand side response where flexibility in how and when resources consume energy is managed to help balance the network. As described in this document, the ability to manage and optimise the energy resources and their flexibility at end sites provides a range of advantages at all levels of the network, and becomes increasingly important as more variable energy supplies, such as wind and solar are added to the network, or with the electrification of mobility and heat, that add increasing loads onto the network that vary with location, time and season.

The flexibility 15 of resources may be traded via exchange means 5 such as data, contracts, marketplace platforms, with energy actors 46 such as aggregators, suppliers, local networks, grid, or peer-to-peer or communities 47, via contracts 49 and enable financial payments 48, or other benefits 50 such as carbon offsets.

Also illustrated is an electrical distribution system 22, typically comprised of a central grid 23 and central energy generation sources, providing high-voltage power. This is transmitted over networks 24 to medium-voltage networks and substations 25. This is then distributed to low-voltage networks 26 and step-down transformers or distribution sub-stations 27 which provide end customer power. The end customer power may be provided, potentially on different electrical phases, to end sites 18, typically via meter devices 6, 28, or to unmetered loads such as street lamps or network attached charging points 29, which typically use a virtual measured central management system approach. Within an example site 18 there is shown example resources 7 on the distribution network such as solar 31 and battery resources 32, mobile phone network masts with batteries 44, sites and buildings 45 with flexible demand side resources, and similarly an electric vehicle charger cluster 33 formed of individual Electric Vehicle charger apparatus 34 (that may also be co-located in a home or street), and an example electric vehicle 35. Similarly around an example house site 38 is shown a residential solar system 36 and battery 37, a high-load/duration appliance 39, and site data/patterns 40, consumer access devices 41, such as smart phones 42 and internet browsers on computers 43.

In an embodiments of the management and optimisation system 1, methods would seek to orchestrate and manage distributed energy resource assets on an individual and aggregate basis to deliver an optimal return for such assets and their owners (customers or asset vehicles) as an "Energy as a Service" (EaaS) model or as a battery operator 'BOP' by providing flexibility and services across a spectrum of potential beneficiaries, from BTM—"Behind the Meter", typically for end customers or buildings, ATM—"At the Meter", typically for energy suppliers or energy service companies, LTM—"Local to Meter", typically for local distribution networks, developers or communities, FTM—"Front of the Meter", for wider grid actors and system benefits. Said optimisation method typically involves optimising for a single or co-operating cluster of beneficiaries, and learning energy patterns and managing flexibility to maximise income on a daily basis, and deliver extra return by making flexibility available on demand via contracts with certain parties for when certain situations arise, such as local network constraints or high value opportunities on the electricity grid.

Within such an approach, an optimisation and orchestration method may seek to manage a pure BTM—in home/building customer benefit, or to align objectives between, say, a Utility supplying the customer (BTM+ATM) or across a local group of customers as peers (in a peer to peer model) or as a group (BTM+ATM+LTM) such as houses and EV customers, Utility suppliers and local network. In such a situation algorithms need to consider 1) the data and identity characteristics and manage according to goals such as a) local limits on the network that may act as constraints on supply or timing and rates of charging, or b) limit export of energy from renewable or battery/EV resources, and 2) constraint scoring (e.g. risk of the power network not having enough capacity to meet demand) and 3) prediction of shiftable demand or flexibility in homes or vehicles and 4) risk scoring of the flexibility and predictability of the resource to account for where it may be limited e.g. by forecast energy demand needs, the size and availability of battery resources, knowledge of occupancy or non-occupancy of building, location of an electric vehicle (e.g. if not connected), or contract or market constraints, e.g. where an energy supplier may not wish to provide flexibility if it impacts their trading position or where flexibility may be desired for a wider grid issue or contract opportunity.

According to an embodiment, a method of optimising behind-the-meter (BTM) benefits by the management and optimisation system is provided, where the system processes real-time or periodic data from end devices to manage distributed energy storage resources to inform and manage charging or trading. A method comprising:

a) analysing data sources such as i) energy use, ii) local solar production, iii) weather forecast data iv) calendar information, past performance and learnt behaviour v) tariff profile information (e.g. for period of day) or rules vi) customer preferences or rules, and b) algorithmic approaches to make data-driven predictions of e.g. i) predicted load ii) solar generation iii) EV charge usage iv) battery charge plan v) risk profiles and flexibility, to optimise and inform e.g. a charge plan adjustment for storage resource (such as a battery or Electric Vehicle), or to inform an end user on consumption and choices, or to inform and advise an energy supplier for forward prediction (e.g. to aid trading) and intervention options (to improve trading), c) decision logic to make adjustments (e.g. to charge plans) to achieve desired behaviours or goals, such as i) minimising energy use from grid ii) maximising self-consumption of solar resources iii) minimising price iv) minimising CO2 v) optimising battery performance, vi) managing state of charge and battery performance vii) achieving a charging goal (e.g. for Electric Vehicle) or for a battery (back-up readiness), viii) responding to a change request or flexibility opportunity from a third party, such as local party, Utility supplier, network, grid contract ix) providing capacity to respond to flexibility opportunities, d) status and performance reporting, e.g. for battery management, system, customer email, report or GUI display, or counterparty.

Such algorithms may make use of machine learning, pattern recognition and feature and event detection (e.g. of a high load, occupancy event, start of a charge cycle), training of neural networks to aid recognition of patterns or classifying patterns that are unusual, use of modelling, convolution and comparison, forecasting and probabilistic modelling (e.g. of energy load profiles on event detection, solar profiles, EV charge patterns), or Markov modelling to model probabilistic transitions and paths between likely subsequent states and duration of energy devices in use, or transition states in EV charging, feedback networks, predictive learning, linear programming.

Said event detection and short term forecast may make use of simple multi-layer perceptron or recurrent neural network, or disaggregation or profile information to determine and focus on events that have a prolonged impact on a forward profile, such as detecting the start of a high-load appliance such as a cooker, air-conditioner or washing machine, by detecting substantial step change in energy use, and disaggregation and pattern recognition approaches, such as referring to past profiles and learnt behaviour. This has been found to be particularly advantageous for informing forward predictions for such high-loads, or standard electric vehicle charging events, as well as rises in consumption triggered by occupancy (e.g. detection of return to work, away—e.g. holiday modes, night time slow down), and various tools such as risk-profiles can lend weight to the stability of such forecasts and past reliability to inform energy management and how predictions are used for trading, battery charge plan adjustments, wider flexibility availability. Such approaches can also be particularly advantageous in aiding accuracy of short term interval or half-hourly settlement approaches, in making adjustments to household load, e.g. via changing the battery charge/discharge pattern, or updating trading positions—typically reported ahead of a time-gate. Similarly, such approaches on EV detection and charge profile prediction can be valuable to local network managers, and to inform setting, throttling or limit setting on other charging requests on the same local network.

Event detection, can make use of various approaches, such as creating or matching to appliance signatures, by recording significant and sizeable change events over a time interval of measurement of aggregated active power, and knowledge based learning, and storing of signatures to a database, or by removing certain probabilistic signatures from a profile and comparing to performance, or labelling of unlearned patterns to inform risk profiles. Of particular relevance for reliable prediction is events that have a high probability of duration, thereby influencing larger power flows or availability for flexibility, than say short duration events. As such a probability map and risk weightings on predictive load change can be assigned by focus on selective disaggregation and identification of high and long probabilistic duration events, within a typical energy load profile also characterised by a general background of multiple shorter event activities, and improved by machine learning techniques as patterns or cluster correlations of activity repeat.

In an example embodiment of said management and optimisation system, a software system, enables real-time connectivity or interval processing of data from end measurement devices, to make data available for consumer presentation or analysis and processing to enact a remote control change or program a local control change on an end resource, such as adjusting a battery management system or charge plan, by for example: the end user, in response to an external request or as an optimisation using data from I) local sources: such as battery State of charge, energy use, solar supply, EV demand, or II) from a predictive forecast using such data and additional insight from prior patterns, detection of large loads, occupancy awareness, start or expectation of EV charging (e.g. GPS geo-fencing), or learnt behaviours associated with detected events or date patterns, or III) optimisation to external signals such as current, short-term and days ahead forecasts in weather, solar irradiance, market pricing, or time of use tariffs, or IV) to real-time price information and e.g. time interval such as Half Hourly price data from suppliers, price signals and requested adjustments or opportunities (e.g. low cost), V) or from a recommendation from modelling to show the benefit of an alternative tariff or energy resource opportunity.

Said consumer presentation, may include selectively displaying real-time or interval energy use data on a consumer access device (such as a mobile phone, tablet, home energy display, internet browser) of building energy use and energy from grid, solar production and use, battery charging status, percentage and capacity KWh and energy flow, electric vehicle battery charging status, and show energy flows, together with analysis or time based views, such as usage graphs, pricing information and savings totals, benefits, together with alerts on status or choices, forward predictions, comparisons of historic data with current or peer group, and allow settings or changes to be selected by end users, together with administrative functions such as data management, updates on user data such as WiFi, account information, addresses, tariff information, and customer support areas such as documentation, product and warranty information, service information and fault/investigation requests, visibility of price plans or flexibility access, settings and contract choices.

Said external request may be from an energy system stakeholder, and form a demand side response for flexibility, e.g. from an energy supplier for a tariff or imbalance motive, or from a local network for a local network constraint, voltage, power or fault issue, or from the overall grid system for a frequency response, demand turn-up, demand-turn-down, capacity, or balancing market requirement.

Said software system and modelling may make use of decision logic, such as binary classification of events and decision trees on probabilistic evolution of the event (such as an energy load or set of consumption behaviours), or neural networks to detect if patterns of use are within normal limits or represent exceptions or patterns attached to particular sets of events, data or calendar days, or use models to schedule and allow recovery time from events or uses of flexibility.

Figure 8:
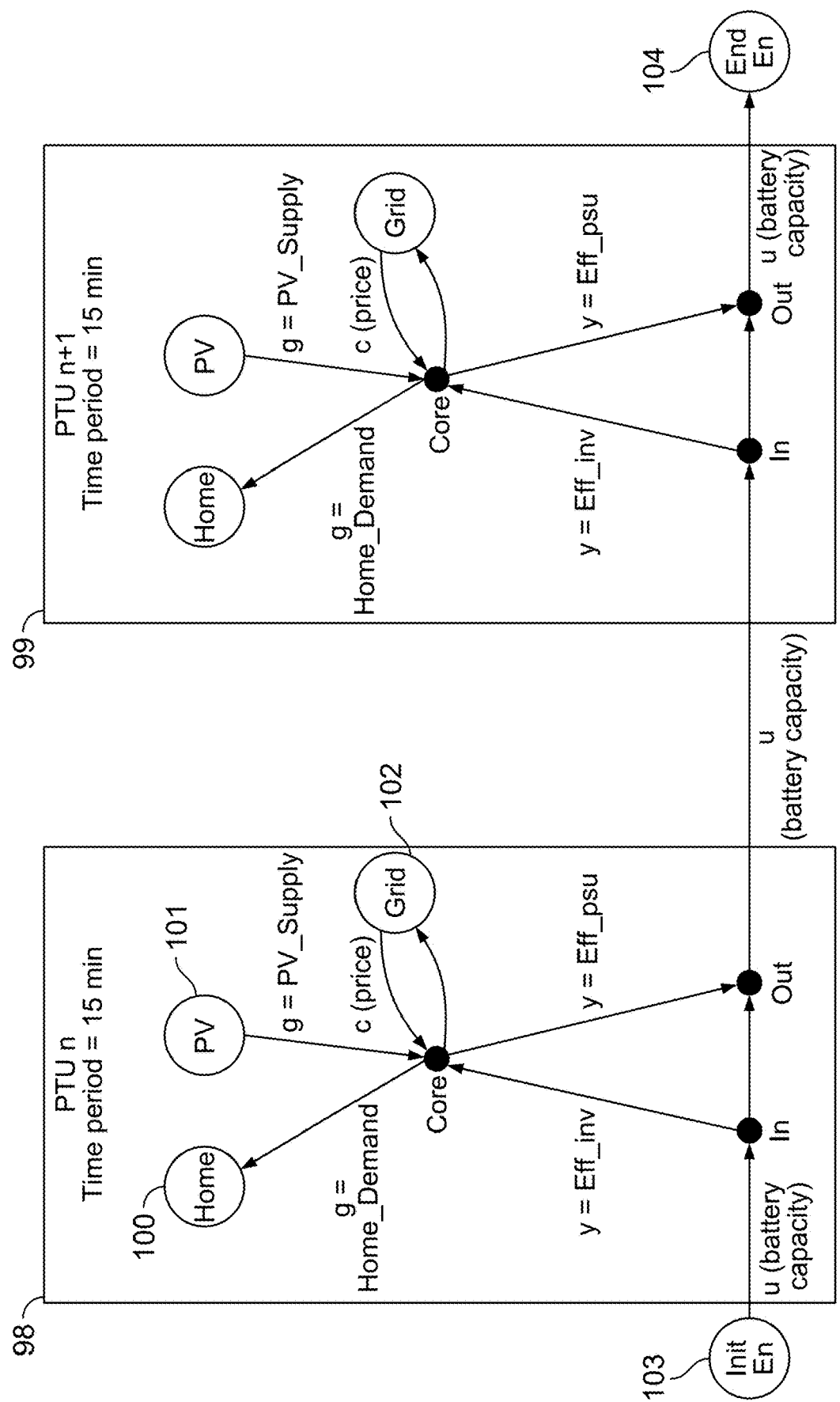
FIG. 8—describes an example optimisation approach to vary a parameter (battery charge/discharge) based on a linear programming approach between a set of data and variables at a start of a time period, and a predicted set at a further time period, illustrated as a flow chart schematic.

Said optimisation and decision logic, may also make use of linear programming techniques to focus an optimisation between maximising various properties (e.g. demand, PV supply, grid tariff price, weather) within a specific interval and time unit (TU), and establish a typical flow chart of measured or expected characteristics, and how, e.g. by varying a battery charge rate/discharge parameter in a household battery or electric vehicle charging plan, a local optimisation could occur for predicted time interval (see FIG. 8).

Similarly a data store or vector may store a measurement or expected profile of such predictions, or general predictive forecasts from the algorithms, for a series of periods 'programme time units' (PTU), preferably in units of an hour or less, e.g. 15 minutes, and optimise as a rolling window across a suitable period (e.g. settlement, or day ahead—96 PTU intervals; $T_0$-$T_{96}$) for variables including:

BL(t) {Building_Load: Load_Kw$_{T0-96}$, LineVolt$_{T0-96}$, Freq$_{T0-96}$}

ML$_1$(t) {Grid_Metered: Kwh$_{T0-96}$.}, ML$_2$ (e.g. secondary/device meters, sub tenant).

EV(t) {EV_status: Charge_Kw$_{T0-96}$, Capacity_Kwh$_{T0-96}$};

PV(t) {PV_gen: Kw$_{T0-96}$, Kwh$_{T0-96}$};

PVT(t) {PV_FiT: Settle$_{period}$, £$_{gen/KW}$, £$_{export/Kwh}$; £$_{if\_variable\ T0-96}$}

OG(t) {Other_gen: Kw$_{T0-96}$, Kwh$_{T0-96}$};

TA(t) {Grid_Tariff: Settle$_{period}$, £$_{stand}$, £$_{PAYS}$; £p$_{T0-96}$, CO2 g/kwh$_{T0-96}$}

BS(t) {Battery_Status: Charge_Kw$_{T0-96}$, Capacity_Kwh$_{T0-96}$; CycleCost$_{per/Kw}$};

WE(t) {Weather_forecast: T$_{T0-96}$, Humidity$_{T0-96}$, SolarRad$_{T0-96}$, Cloud$_{T0-96}$}

Data stores may also include customer or site rules or preferences, reference charge plans, calendar records and default modes, occupancy, learnt or detected behaviours and modes, energy device signatures, lists of known devices at a site and typical use times, and risk profiles. Data stores may also be used to capture market signals or flexibility needs, such as designation of times of day for peak-off/peak, periods of limit e.g. congestion or constraints on networks, contract periods or needs for flexibility, DSR turn-up/turn-down, availability, at a local level (e.g. excess/demand from solar/battery/chargers), utility, network or system operator level.

Figure 9:
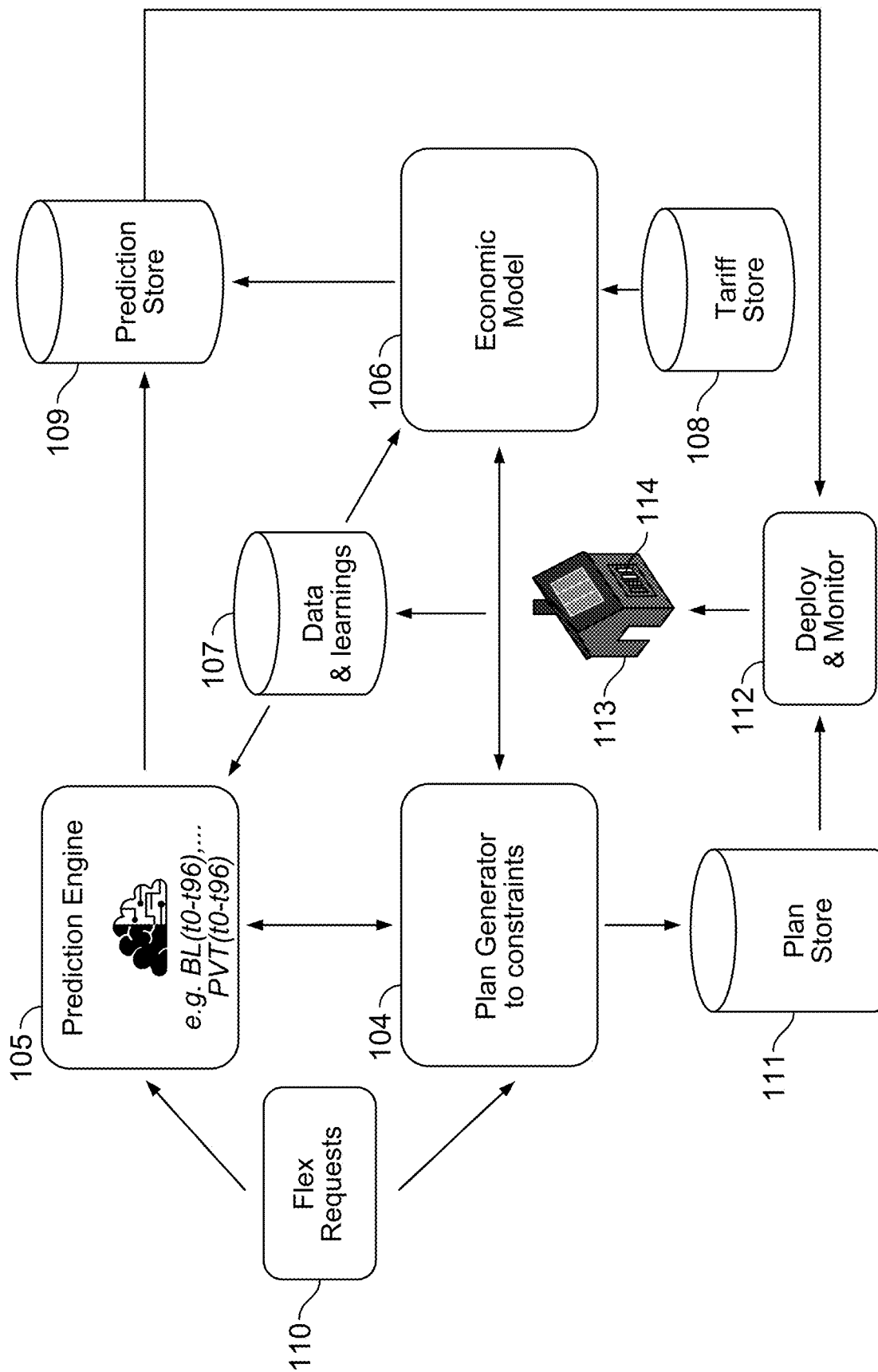
FIG. 9—describes an example predictor method within a management and optimisation system, which uses monitored data, to generate a plan with interaction with a prediction engine and an economic model based on system and tariff choices.

Within a management and optimisation system, a software system method of optimising a behind the meter customer benefit, may include a method of generating a plan (for flexibility e.g. charging/discharging of an asset), based on sharing current and monitored data with a prediction engine and an economic model, wherein said economic model calculates an impact of the example plan subject to other data (e.g. battery, PV sizing, choices, tariffs) and with reference to a tariff model or store; and said prediction engine calculates a forward model of consumption and generation for applying such a plan, along with other factors and data (e.g. weather or other consumption predictions) and stores the prediction, to enable performance monitoring and feedback to the system or requests for new predictions, if there is divergence of measured variables from the forecast, and manages the storage and deployment of the plan to ensure end assets perform in accordance with the plan objectives (see for instance FIG. 9).

According to another embodiment, a method of optimising "Behind-the-Meter" (BTM) and Utility supply "At-the-Meter" benefits by the management and optimisation system is provided, where the system processes real-time or periodic data from end devices to manage distributed energy storage resources to help inform and manage the overall energy shape of the trading and supply of energy by managing and adjusting charging. A method comprising:

a) Monitoring end site, device and resource usage and supply, and receiving prediction forecasts on usage, risk profiles and available flexibility b) Aggregating site usages and forecast to understand overall aggregate energy demand and flows c) Analysing how such forecasts impact current trading positions and strategy on e.g. i) energy supply, ii) price or other objectives, e.g. carbon or availability for other trading of flexibility, iii) imbalance management, iv) tariff and customer obligations vi) intervention options, costs and availability, vii) income opportunities from flexibility or market opportunities d) Updating of settlement processes and trading models, adapting forward energy trading purchases based on monitoring and forecasts or exposure e) Modelling and Decision logic to make or schedule adjustments to end sites, such as by making adjustments or requesting changes in charging plans, requesting DSR—demand side response or adjustments, making alerts, price or behaviour offers or future customer offers f) Performance monitoring and reporting e.g. for customer reports, asset use, GUI/performance dashboards, tools for traders and operators.

Within said management and optimisation method, modelling and decision logic may look at considering alternate tariff presentations or offers to end customers that favour the overall trading position and offer mutual advantages or reflect more accurately supply costs and charges, such as by settling on shorter time periods (such as half hourly) than longer period averages, or by helping to provide or encouraging access to flexible assets—such as Demand Side Response (DSR), storage or flexible EV charging, or by offering tariffs that reward or encourage certain time of day characteristics (e.g. off-peak charging), or by agreeing increased data access to households, such as EV location (GPS or vehicle sensors), occupancy or other sensors, additional real-time meter data, to improve prediction capabilities.

Within said management and optimisation method, approaches may consider multiple factors in choosing how multiple assets (e.g. batteries, EV, Heat storage, DSR) and flexibility across a group of sites under management and energy supply responsibility, can be deployed across data and forecast accuracy, availability likelihood, temperature/season and calendar, customer impact, flexibility risk, depreciation cost, and opportunity cost.

Within said management and optimisation method, approaches may need to consider how participants may mitigate or take advantage of alternate local mechanisms and rewards from flexibility, such as peer-to-peer, or indeed offer and host peer-to-peer benefits to end users and seek to optimise how resources (outside of the supplier responsibility) could be procured or obtained to benefit the end customer and supplier trading position, e.g. by offering to alter charging plans, trade excess supply or demand at the household level, to local participants, to improve its overall trading position and imbalance exposure.

As an example embodiment a group of co-located or co-operating households may opt to form a community for peer or shared resource benefits, such as for batteries, solar, EV charging, and opt to offset and settle as a group, e.g. on a half-hourly or interval basis, against each other, or against and with a site that is already settled on a half hourly basis (such as a larger wind or solar generator) or business. This has been found to enable some local trading by virtual metering, and enable greater virtual pooling of solar and battery resource within a community, even within restrictions on how households are metered and settled. An optimisation method within such a community may seek to share, energy data vectors and status on demand, batteries and solar, across a community, and to trade by various exchange mechanisms (discussed earlier) or platforms spare flexibility and capacity. From an overall supplier perspective, a supplier may settle and offset against the business/larger site, such local trades and offset each individual meter record directly.

According to another embodiment, a method of optimising a group of "Behind-the-Meter" (BTM) and Utility supply "At-the-Meter" requirements alongside Local-to-Meter (LTM) benefits by the management and optimisation system is provided, where the system processes real-time or periodic data across a plurality of end devices within the location to inform software systems to manage an aggregate performance of energy storage resources within local constraints. A method comprising:
  a) Monitoring multiple end site devices and resources for usage, supply and charging rate and receiving prediction forecasts, risk profiles and available flexibility and spare capacity from end sites and on the local network
  b) Aggregating site usages and forecast to understand the predicted overall load forecast, demand and flows across the location or low voltage network, comparing or learning of local network use characteristics to unusual, seasonal or calendar adjustments, or peak periods of electric vehicle clustering and charging.
  c) Analysing how such forecasts could impact local network performance, or in response to limits/faults on the network, such as voltage rise or drop, power quality issues, heat-pump/electric heating demand peaks, issues on different phases, breach limits, create faults, or stress assets, for example from excess end-site loads, excess solar export, high demand from electric vehicle demand, vehicle to grid/power surcharges, inequality in network load creating downstream constraints, stress on the sub-station or fuse-breach risks.
  d) Modelling and decision logic to make or schedule adjustments to local active management plans, central or distributed battery resources and EV charging, solar curtailment, heat-resources, DSR assets, or to co-ordinate requests to share energy and flexibility between local participants or to and between local assets (such as distributed or central battery, solar, heat, charging resources)
  e) Enacting active management controls, such as setting EV charge limits or 'throttling' rate of EV charging, or contractual controls and reduction of assets export or import rates.
  f) Performance monitoring and reporting of contract delivery, payment or compensation obligations, asset use, data for tools and dashboards used by operators, visibility or reports to end users or stakeholders
  g) Management of any impact on settlement, charges or cross charges to participants related to use of network chargers or payments for flexibility and capacity, or contracts in lieu of capital deferral agreements.

In an example embodiment, a method of actively managing and throttling rates of electric vehicle charging across a site or low voltage network is provided by a management and optimisation system, to allow a greater freedom, equality and access to faster charging rates, than might be allowed at the site without further upgrades, charges or inequality. Where said method involves some of i) actively managing and throttling charge rates, ii) setting a rolling forecast and forward charge curve governing such charge rates, iii) using price signals or incentives to encourage adjusting of rates or times of charge, iv) curtailing charging or high rates of charging at certain times or events v) establishing suitable charging protocols or automatic response and self-regulating mechanisms at individual electric vehicle chargers that in aggregate act to improve the controlled performance of the network. Said method typically involving stages of:
  a) Monitoring real-time or at intervals, end consumption of meters, energy supplies and demands, electric vehicle status and charge rates, charge requests, and prediction forecasts, risk profiles and available flexibility from end site resources and the local network performance and across phases.
  b) Forming an aggregate model of load and network performance using such measurements and forward predictions, to analyse issues on overall load and network performance, comparing such models to learnt behaviour or prior patterns and making adjustments to local, seasonal, calendar or peak period clustering and charging, as well as prior flexibility delivered from active management of charge rates.
  c) Decision logic to evaluate and schedule adjustments, e.g. to vary in real-time "Throttling" of EV charge rates, or to update forward pricing or charge curves governing current charging rates or new charging requests are managed, or to factor in or enhance distributed charging protocols that act to self-regulate and balance the system, together with evaluation of economic models of intervention such as cost, convenience, carbon, network capital deferral, asset stressing, network risk.
  d) Enacting and managing said active management controls or communication to manage charge rates on end devices, as well as auditing responses or compliance of end systems, or managing central reserves (batteries or aggregates of distributed batteries) as part of an active management response.
e) Performance monitoring and reporting of contract delivery, payment or compensation obligations, and sharing of data for tools, dashboards, end users, or stakeholders, asset funders.
f) Management of any impact on local settlement, or charges or payments for flexibility or in lieu of capital deferral agreements In an example preferred embodiment, said optimisation and management system, may connect to measure or control an Electric Vehicle battery state through a variety of software or physical device mechanisms including i) standards for EV, chargers, APIs for data exchange, common or device control protocols, ii) electric vehicle operating systems iii) controls to or embedded in Battery management systems and battery cells iv) EV charger apparatus and standards such as SAE CCS, OCPP, CHAdeMO v) smart hubs and attachments to EV charger apparatus vi) Smart Meters and signals to connected chargers vii) retrofittable controls such as connection plugs between an Electric Vehicle and a charger viii) wireless or inductive means of charging an electric vehicle in close proximity to a suitably configured supply.

Within said optimisation and management system, to consider and measure and forecast different usage across phases, and factor active management into devices that can adjust demands on particular phase, or move demand onto alternate phases to help balance, e.g. through electric vehicle charge-points that may optionally select or draw power from different phases in response to a request.

Within said optimisation and management system, the method may actively manage or recommend addition, of extra battery resource on a low voltage network, either as a central resource or as an aggregate of distributed resources, so as to aid management and balancing on the network, for example storing of excess local solar generation at peak solar hours, or discharging at peak domestic demand, or managing local solar and night/off-peak charging to create extra capacity in batteries to discharge at times of peak electric vehicle demand. In future such approaches can also apply to vehicle-to-grid, vehicle to vehicle or vehicle-to-home applications, where said software system may help to co-ordinate the charging and discharging of such electric vehicle chargers to achieve different outcomes.

Within said optimisation and management system, to use charging protocols based on a TCP like approach, that distribute a decision to vary charging rate, based on measurement of a local property, such as voltage changes, limits, or frequency, so as to proportionally delay charging or reduce charging rates in stress or high load events, or to gradually increase charging rates on measurement of low load or low stress events, and so to self-regulate in a predictable fashion how a charging event behaves.

Within said optimisation and management system, types of modelling that may be used may be, for example, based on decision trees, pattern recognition of charge behaviour and expected duration, patterns learnt from networks of events and characteristics typically proceeding a high-load or fault (e.g. sudden time and clustering of charge events at a point in the day or season/calendar).

Within a management and optimisation system, the software system and protocols may use approaches that can achieve results by consensus or sharing and establishing a price between parties as a form of exchange or market, or achieve an overall optimum for competing objectives, such as by finding a Nash equilibrium or maximising an entropy function. Thus for the case of a network constraint there is an ultimate limit to the aggregate (max power flow) of EV charging (or heat activity) that can occur at a particular rate and time, but through such mechanisms the result can favour a shared outcome that balances different parties objectives or achieves a proportionally fair result. Similarly where Utilities may act in self-interest (managing charging flexibility to their trading position or exposure on imbalance), said management and optimisation system may seek to achieve a group optimal result that favours managing to the network constraint, of wider benefit on sharing or reducing upgrade costs, whilst minimising or compensating for imbalance or change to each utilities' impact on their trading or inconvenience to end customers on access and charging rate. Within the forecast and vectors certain times may favour open trading and charging driven by price signals and nudges, whereas others, and in particular peak seasonal charging, may be driven by proportional fairness approaches.

Within a management and optimisation system, where local peer to peer trading can be supported, the measurement and forecasting of local flexibility may be advantageous in identifying local flexibility that might otherwise not be visible or known to other parties. Price signals and visibility of local charging or constraints may aid such availability and help provide extra flexibility that can be co-ordinated by the system.

According to another embodiment, a method of optimising a group of resources across BTM, ATM, LTM and FTM front-of-meter benefits by the management and optimisation system is provided, where the system processes real-time or periodic data across a plurality of end devices to achieve their objectives whilst calculating or optimising spare capacity to participate in other flexible markets. A method comprising:
a) Above outlined approaches on monitoring devices, forecasting and modelling
b) Awareness and Economic modelling of contract opportunities for flexibility, either on a routine availability basis, or on forward market basis, or to market signals and requests
c) Decision logic to evaluate the benefit of participating and sharing flexibility, vs other customer, utility, local objectives, and costs and impact including recovery times, d) Management of dispatch of individual assets or aggregate groups of assets
e) Auditing and performance reporting of fulfilment of flexibility requests, and managing flow of benefits to asset owners, or compensation or income sharing to asset or parties effected by the flexibility deployment
f) Learning and optimising from successful flexibility engagement to inform subsequent pricing or participation Within a management and optimisation system, a software system method of delivering flexibility is provided, wherein individual assets can report their monitored status, generated charge plans, predictions, to a flexibility engine, which can turn a flex request (for availability of delivery of flexibility to a market), into a constraint and adjustment to a plan, and model and calculate the cost, risk and recovery by applying such a constraint to a plan, in order to validate whether it can be assigned and aggregated into a group for dispatch to deliver such flexibility to a flex request, and to enact and manage performance of the delivery of such flexibility across a group, including managing the order, delivery, reporting and allocating reward from such performance.

Within a management and optimisation system, a software system may also aid management and modelling of a bid-engine, which manages a pipeline of potential requests for flexibility from different parties, preferably through standard approaches, APIs, protocols and frameworks, such as the USEF (Universal Smart Energy Framework) framework for expressing flexibility in universal terms, and to aid matching and scheduling suitable sets of resources, that can bid or offer prices and contracts into such bid-engines, and where this is for example market functions for managing local market flexibility such as DSO (Distributed System Operator) or network markets and platforms, or to peer-to-peer markets and trading platforms, or as part of whole system auctions and contracts managed by the system operator.

Within a management and optimisation system, a software system may aid the management of resources to participate in a peer-to-peer or peer-to-community offering of flexibility, by means of aiding matching supply of available or aggregates of flexibility from some participants or central resources, to demands for local flexibility from other participants or central resources, and aid managing such transactions, through e.g. providing data on availability, providing forecasts on energy usage, providing exchange means to manage such data or transaction, providing control and management over interventions, such as changing charge plans, providing performance monitoring and auditing of exchange and compensation or accounting of changes to meters or other settlement charges. Such a system has been found to be particularly advantageous even when flexibility and battery resources at locations are small (e.g. 1-3 KWh) as sharing such resources in aggregate can have the impact of switching off entire aggregates of houses or resources from the grid, or the overall energy demand more closely matching a predicted average profile, aiding local and wider grid stability. Pilots of peer-to-peer and peer-to-community exchanges (https://localisedenergyeric.wordpress.com) have been found valuable to share end user resources (such as solar and battery) across different types of customer groups (private, social housing, schools, community centres and EV charge points) to be orchestrated for an overall benefit such as reduction in energy cost, sharing resources, reducing network constraints, or switching groups off grid during high price periods.

Figure 2:
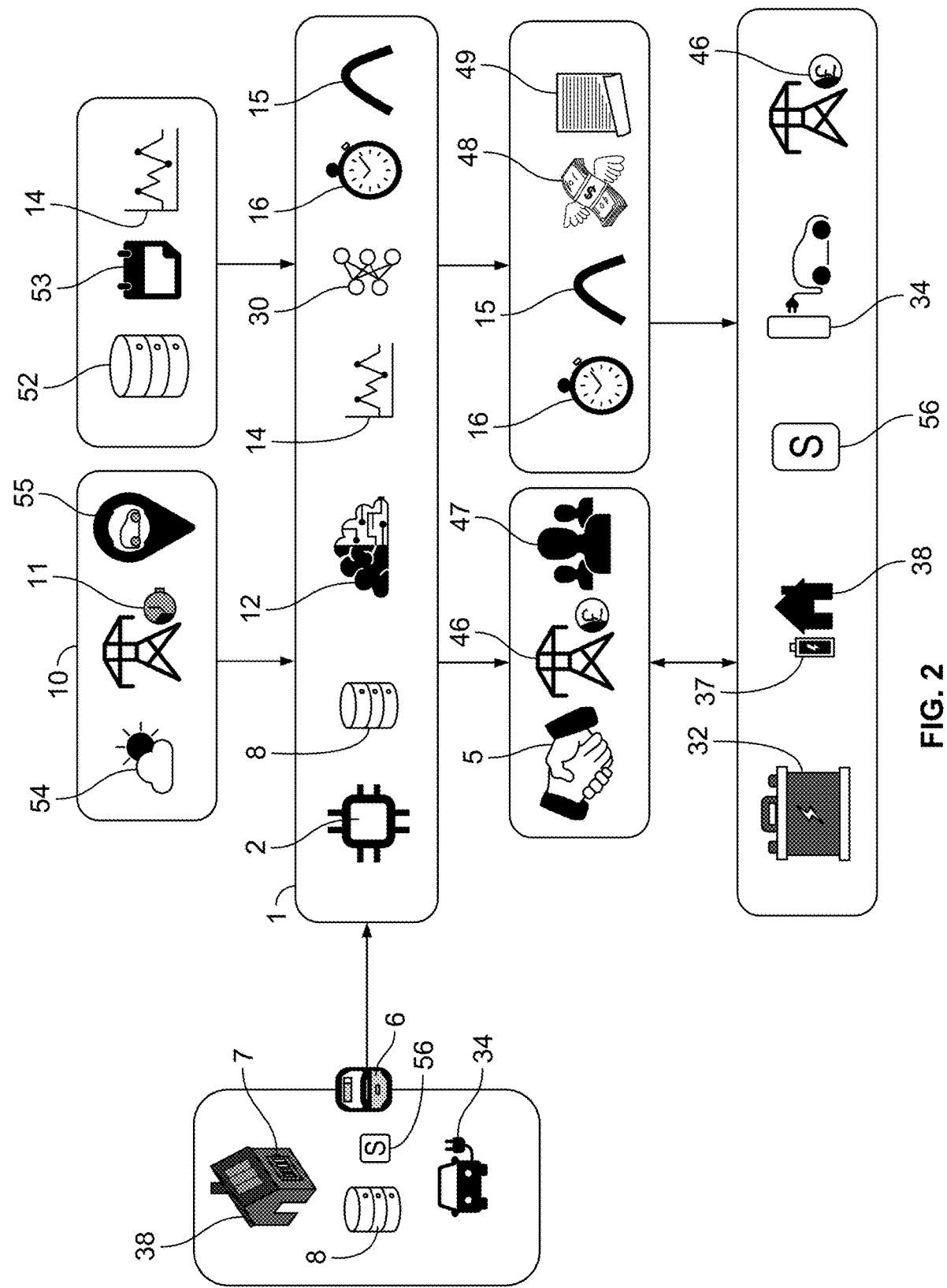
FIG. 2—shows a schematic of data from third-party or meter resources, or from battery or smart-hubs, being processed by a software system (or brain) alongside inputs from grid, weather, calendar, settings and aiding the formation of predictions, to inform flexibility for trading, network or grid balancing opportunities, or to drive a charge plan for a connected asset such as a battery, electric vehicle charger, or smart hub controlling a resource.

Referring now to FIG. 2, this shows a particular configuration of the system 1 of FIG. 1 used for developing predictions for energy usage at end sites. Thus, FIG. 2 shows a schematic of a management and optimisation system 1, where data from third-party or meter resources 6, or from batteries 7 or smart-hubs 56, is received and processed by a software system 2 or by algorithms 12, alongside inputs 10 such as weather 54, supplier time of use or market prices 11, location/occupancy 55, stored learnings 52, calendar reference 53, to aid updating predictions 14. These predictions are used to inform flexibility for trading 15, network or grid balancing opportunities 46, 47, or to drive a charge plan 114 for a connected asset such as a battery 32, 37, electric vehicle charger 34, or smart hub 56 controlling a resource.

Figure 3:
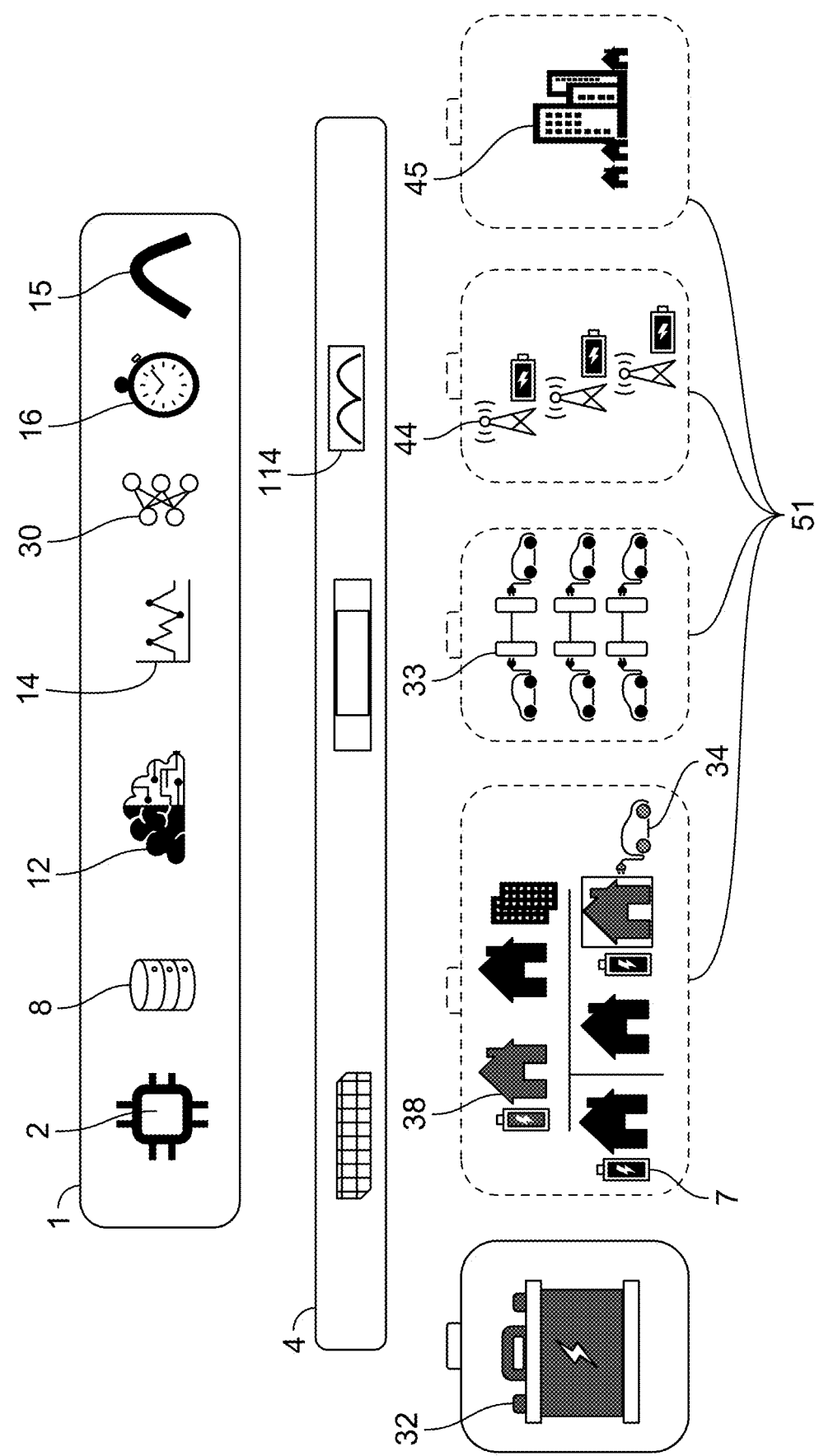
FIG. 3—shows a schematic as to how a management and optimisation system could manage flexibility from either a larger battery resource, or an aggregate of distributed battery resources forming a virtual battery such as from homes, EV chargers, telecom masts or demand response assets in a building.

Referring now to FIG. 3, this shows a schematic as to how a configuration of the management and optimisation system 1 can manage a central battery resource 32, or a virtual battery 51 formed as an aggregate of resources, such as a group of distributed energy storage resources (e.g. batteries 37 and electric vehicle chargers 34) associated with houses 38, a cluster of electric vehicle chargers 33, a cluster of telecom masts with batteries 44, demand turn up and turn down resource assets in buildings 45.

Figure 4:
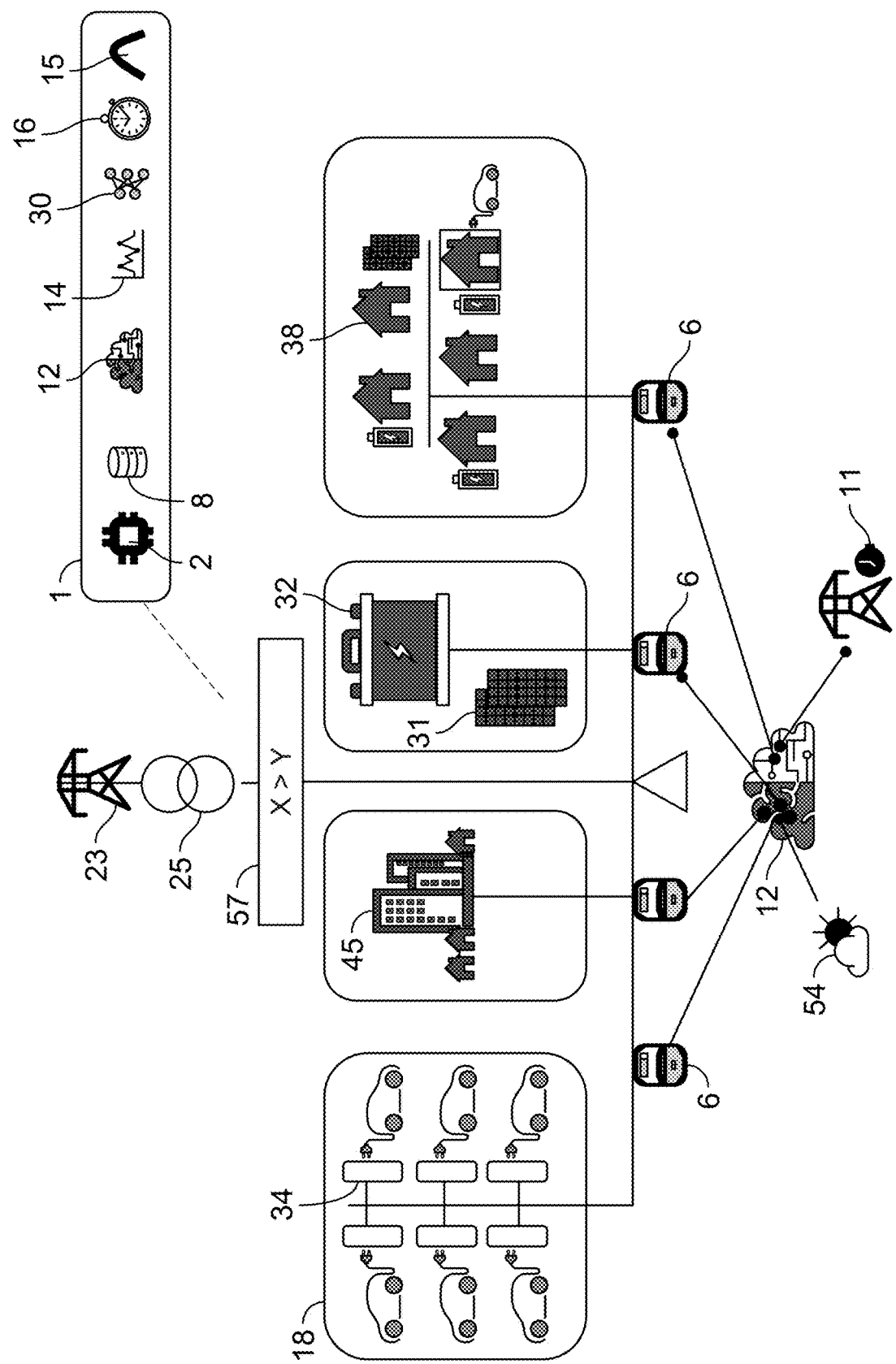
FIG. 4—shows a schematic of a management and optimisation system aiding control of a local network formed from a plurality of resources, including houses, buildings, EV charger parks, larger battery and solar resources.

Referring now to FIG. 4, this shows a schematic of a configuration of the management and optimisation system 1 aiding control of a local voltage network 25, wherein an active management of resources could deliver a saving 57 or deferral of upgrade cost, and local resources such as EV chargers 34, flexible building or site resources 45, could be balanced by managed charging of central resources 31, 32 and community assets (e.g. 38) by the software system 2 and algorithms 12 with local data feeds (e.g. 6, 54, 11).

Thus, for example, a new EV charging park for multiple EVs might be planned on a local branch of the network, where the existing branch does not have the capacity, e.g. too far from the substation or the physical wires carrying the power are underrated, etc., to provide peak power to the EV charging points used simultaneously and at maximum charging rates and/or at peak times. This might result in the local energy distributor refusing permission for the new park unless a new substation or new branch to the park was installed, which typically would be very expensive. The present system 1 can be used to reduce the cost or avoid the need for upgrading the branch line by actively managing the EV charging points, i.e. rates and times of charging, to limit the maximum demand on the local network to an acceptable figure, or to co-ordinate how other local resources such as household batteries charge or discharge, or demand side response resources to help enable larger EV charging loads. Based on a cost analysis, battery storage capacity can be installed at the park to allow further flexibility and active management and allow the possibility of trading flexibility or together with a virtual battery formed by aggregating batteries in nearby locations. Similar considerations apply to building a new town, installing a wind farm and other situations where it is desirable to actively manage around constraints in the network, where providing additional battery or control resources could help reduce this cost whilst also providing these resources for other benefits behind the meter or to the Utility and wider grid.

Figure 5:
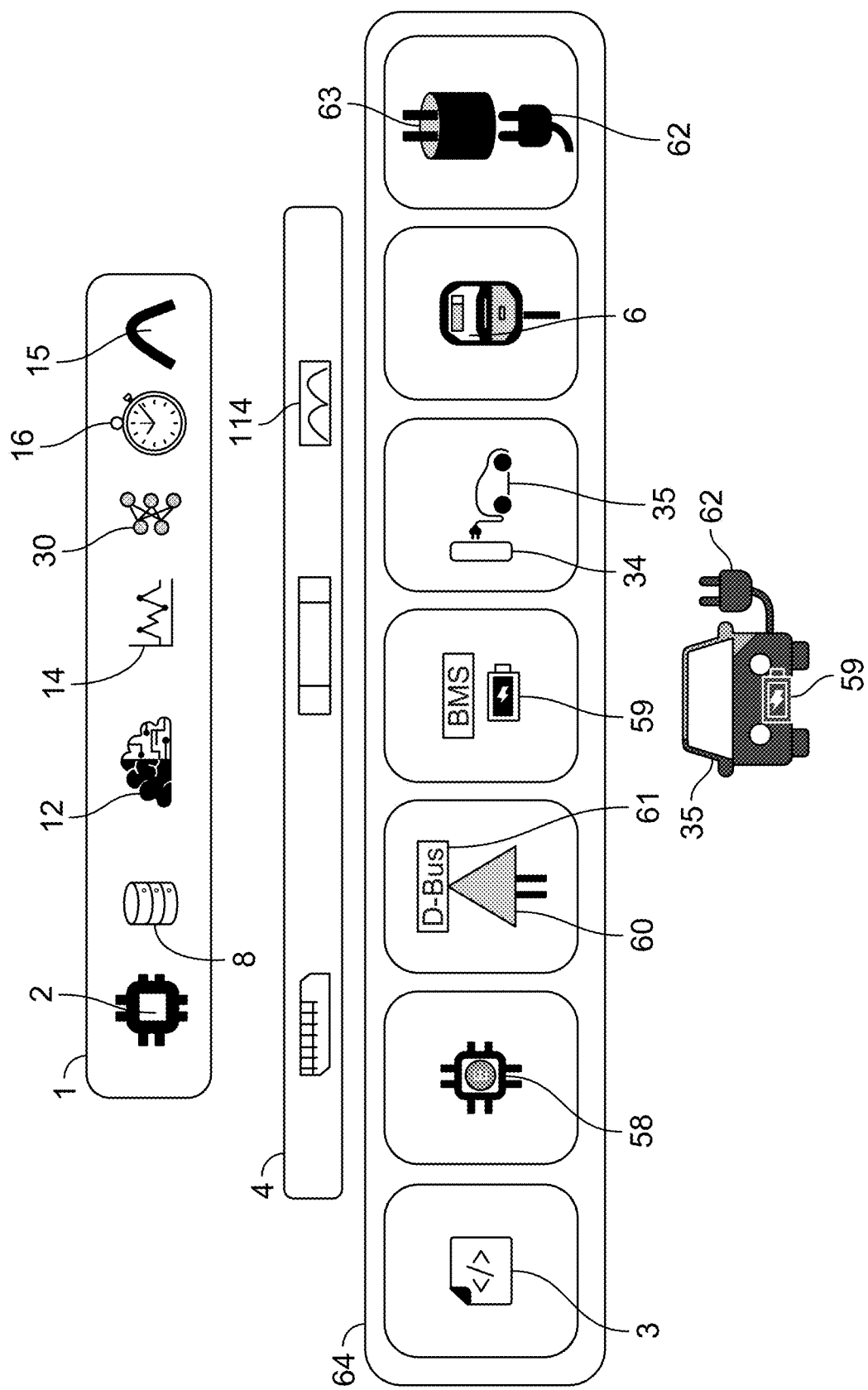
FIG. 5 shows a schematic of different physical device or software approaches for measuring and controlling or throttling the rate of EV charging.

Referring now to FIG. 5, this shows a schematic of a management and optimisation system 1 configured to measure, schedule and control or "throttle" the rate of EV charging. Various methods 64 may be utilised to control EV charging, such as via, cloud and APIs or common protocols 3, on-board EV operating systems 58 and programs on the vehicle 35, a battery management system 59 and battery system, a smart hub controller 60 configured as a universal communication board for device level integration and hosting device control protocols for electric vehicle chargers or other storage resources typically using a D-Bus 61 and connection to an Internet of Things (IoT) client in the software system 2, software on electric vehicle charger apparatus 34, smart meter 6 communications, retrofittable connectors 63 or devices that attach between a charge apparatus 34 and electric vehicle plug connector 62.

Figure 6:
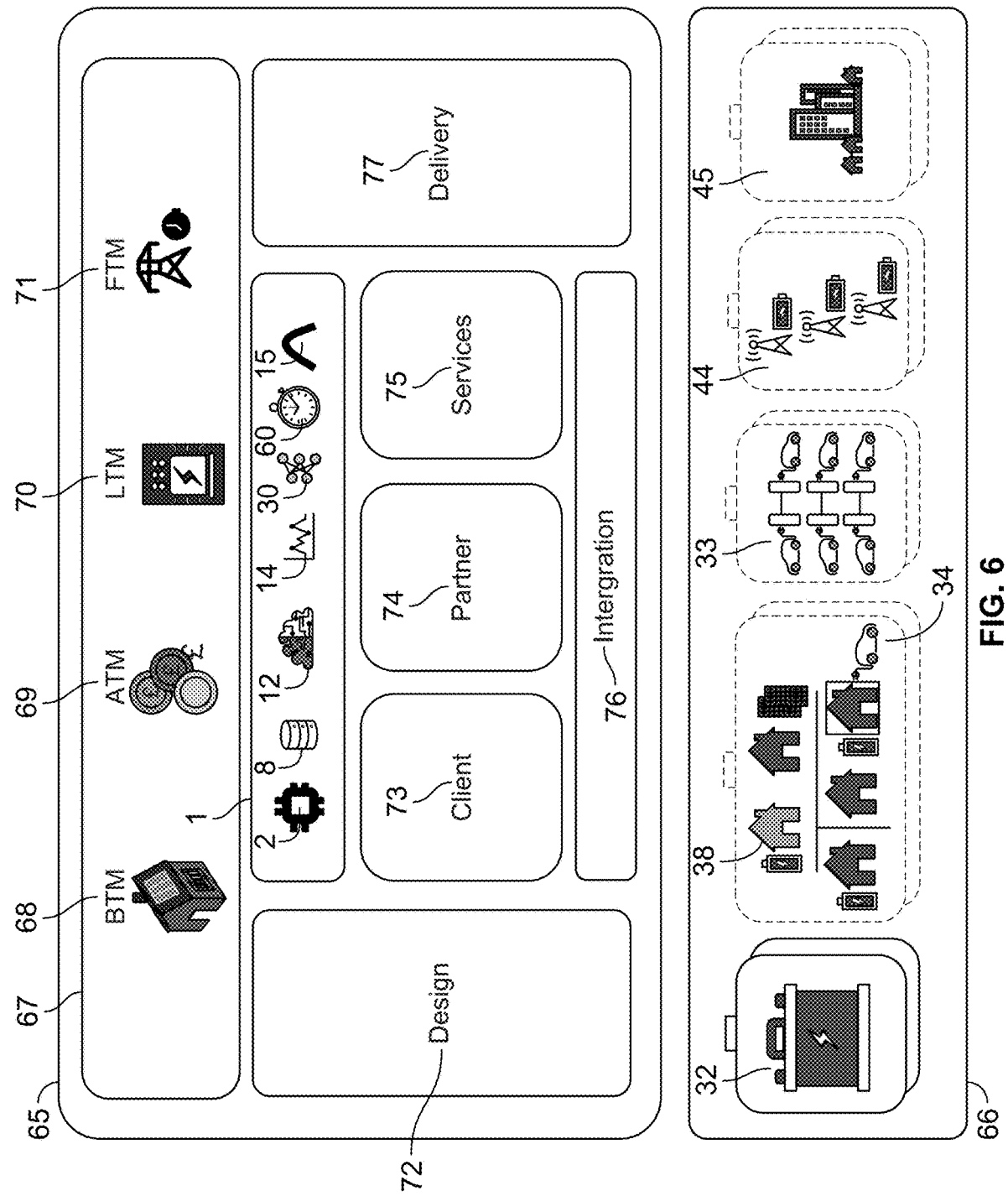
FIG. 6 shows a schematic of an overall battery operator model, for managing assets across a range of "Behind the Meter", "At the Meter", "Local to Meter", "Front of Meter" beneficiaries, through a series of modules that provide client side device management and analysis, Partner or Utility side tools and services, tools for managing aggregates of resources for local network or grid services.

Referring now to FIG. 6, this shows a schematic of an overall battery operator model 65, where a management and optimisation system 1 manages sets of assets 66 and delivers benefits and services 67 across a range of 'BTM' 68 behind the meter, "ATM" 69 at the meter, 'LTM' 70 local to meter, 'FTM' 71 front of meter beneficiaries. This is done through a series of modules that provide client-side device management and analysis 73, Partner or Utility side tools and services 74, tools for managing aggregates of resources for local network or grid services 75, which are configured 76 to integrate and communicate with end devices 6 and resources 7, 66. These services are typically delivered on a SaaS (Solution As A Service) approach involving design work, business models and methodologies 72, integration work and use of API's and protocols in 76, software modules and platforms 73, 74, 75, and contracted service delivery 77 such as sales, set-up, installation, operations and maintenance.

Figure 7:
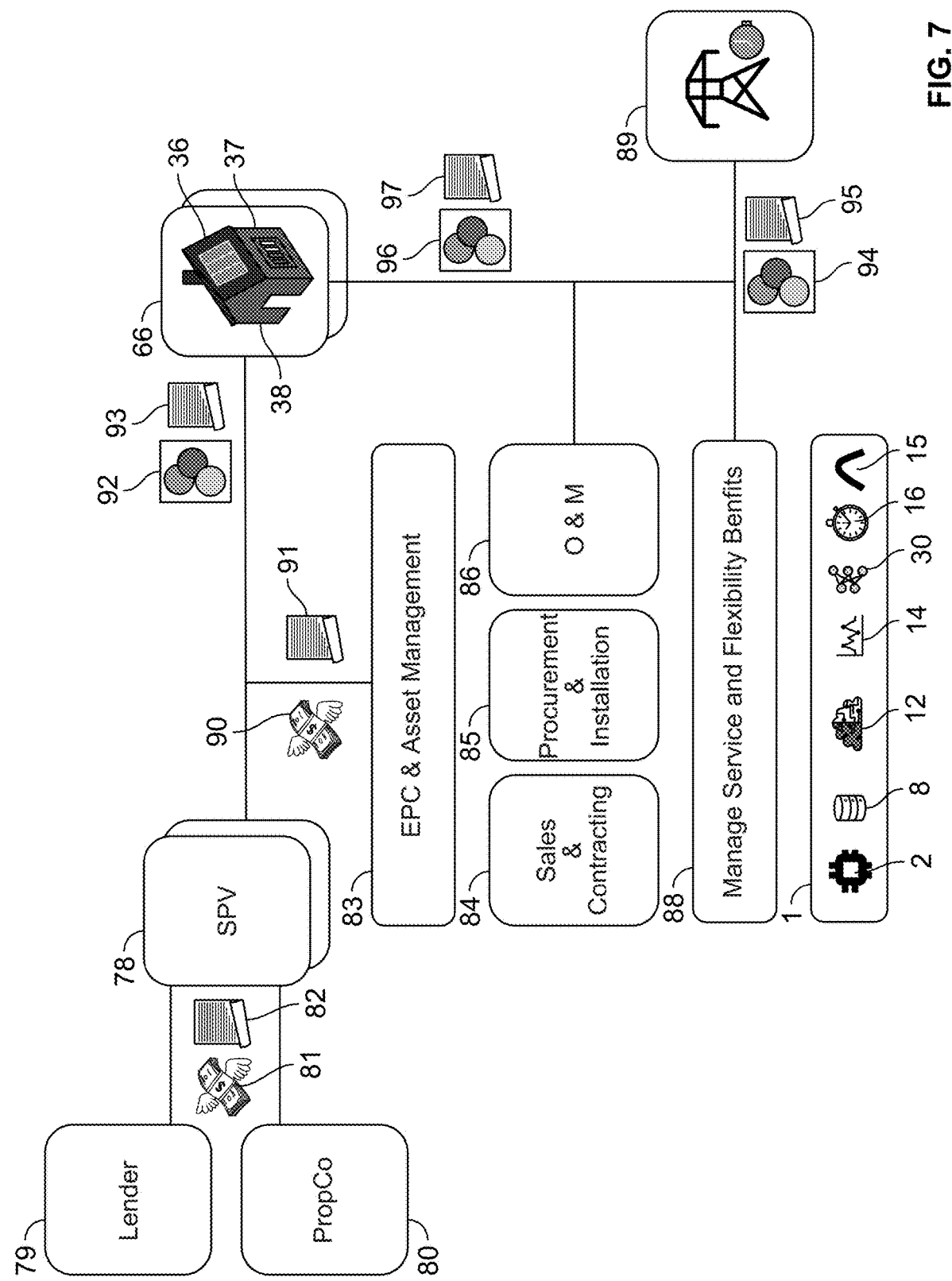
FIG. 7 shows a schematic of a special purpose vehicle and example cash flows or contract relations between participants.

Referring now to FIG. 7, this shows a schematic of a special purpose vehicle 78, lenders 79 and shareholders 80, solution provider 83, distributed energy assets 66, and energy actors 89, and example cash flows or contract relations between participants, such as loan capital 81, loan and shareholder agreements 82, payments 90 to a solution provider 83 under an engineering, performance and construction (EPC) contract 91 and operations and maintenance (O&M) contract 91, for support on sales and contracting 84, procurement and installation 85 e.g. of a battery 37 and solar system 36, operations and maintenance of assets over time 86 and use a management and optimisation system 1 to optimise savings from assets and access income streams 94 from other energy actors such as communities 47, suppliers 47, network operators, aggregators or grid, via contracts 95 or marketplaces 5. Where end customers 38 may for example assign 93 roof space leases and solar feed in tariff incomes 92 to the SPV 79 or pay a rental or PAYS (pay as you save) rate 92, and have a contract 97 with the solutions provider 83 for services (e.g. battery services agreement), payments, incomes or rebates from flexibility trading 96. Said management and optimisation system also using software systems 2, protocols and exchange means 5, to deliver benefits over the term of the asset funding or contract, and to help mitigate differences in income over time as markets, regulation and technologies evolve.

Referring now to FIG. 8, this shows a flow diagram for an example linear programming simple charge-discharge optimisation of a battery based on data models for home energy demand 100, solar supply 101, grid tariff price 102, at the start of a time period 98 and after 99 a programme time period (PTU) and after 99, and applied e.g. to minimise a property like cost.

Referring now to FIG. 9, this shows a schematic of an example of a plan generator 104 method performed by software 2 within a management and optimisation system 1 of generating a plan 114 (e.g. for flexibility, charging/discharging of an asset in a location 113) under various constraints and predictions 14, 109, and external data e.g. weather 54, tariff information 108 and flexibility requests 110. The plan generator method involves sharing monitored data, learnt behaviours and models 107 with a prediction engine 105 and an economic model 106. The economic model calculates an impact of the example plan 114 e.g. by considering data 107 such as battery, PV sizing, choices, with reference to a tariff model or store 108 and predictions 14. The prediction engine 105 may for example calculate a forward model of consumption and generation for applying such a plan, along with other factors and data 107, 54. The prediction 14, 109 is stored to enable performance monitoring 112 and feedback to the system, or requests for new predictions if there is divergence of measured variables from the forecast. The method manages the storage 111 and deployment 112 of the plan to ensure end devices and resources 7 perform in accordance with the plan objectives.

Figure 10A:
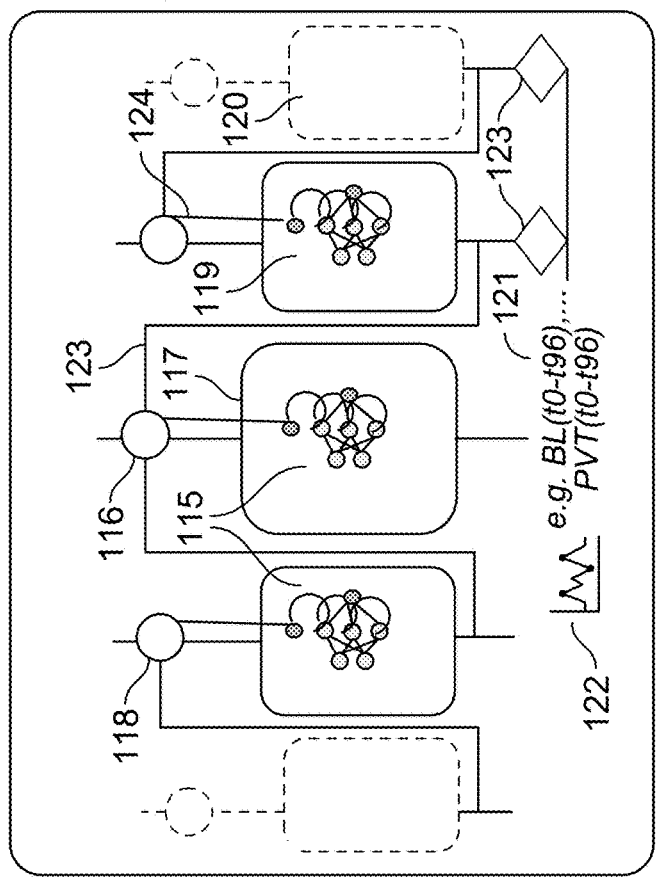
FIG. 10A—describes an indicative recurrent neural network distribution (RNN), to aid in a detection and classification of a typical event (mode or long duration load) or set of behaviour previously observed, and then to branch or test against adjacent neural networks representing a distribution of patterns away from a base or that represent typical patterns for said event.

Referring to FIG. 10A, this shows a schematic of an example of a recurrent neural network (RNN) 115 (such as neural network 30 shown in FIG. 1) to aid in a pattern recognition of an input sequence 121 or classification of a typical event 13 or set of behaviour previously observed from a time series energy measurement or forecast 122, 14 and that have consequence on a forecast load or flexibility 14, 109 for a period of time. In particular, the neural network may be configured for identifying a time dependent or occupancy mode (seasonal or calendar related pattern, arrival, night-time slow-down, holiday) or to help disaggregate and detect a high load, long duration event (e.g. an EV charging, wet-goods appliance, heat-appliance or cooling appliance). These identified modes and events have been found to be particularly helpful to aid the prediction and risk profile of the forecast 14, and in informing a battery charging and discharging plan.

In such a scheme, a dedicated neural network (119, 120, ... ) may be established for each of various target appliances (e.g. an Electric Vehicle) or to represent various modes (holiday, summer solar day, arrival, night-time) An initial feature detection process 123 may be applied to the input sequence 121 before being passed to the neural network to aid such classification. Dedicated neural networks (119, 120, ... ) may also to help validate scalar real-time outputs 116, 118 from other neural networks on key properties aiding the forecast 14, such as device or mode type, start-time, time and power load duration expectation. For example a dedicated neural network may recognise that a change in load corresponds to the start of an electric vehicle charge event, and then use additional learnt behaviour or data (e.g. size and type of vehicle) to make a prediction on the duration of charge and therefore aid informing the forecast load for the next few hours. This then aids a utility on a supply and trade position, or a local network in forward knowledge of load demand on the network. Networks and other mechanisms could also be used to aid classification of new events (such as a new appliance) or an unusual load behaviour in a property (such as a device or resource not responding or indicating a fault). A network output such as solar fault or lower solar output than expected could therefore aid a local prediction and aid a plan.

Similarly outputs 116, 118 from such neural networks can inform a risk-profile and confidence on whether a mode, or dominant device use, and expected probability of duration. The risk profile enables scoring the reliability of a forecast or showing there is not enough flexibility for energy sources to meet demand, and so by developing a measure of confidence in predictions of flexibility, i.e. the probability of the prediction being right/wrong, flexibility in the network can be better managed to avoid possible failures, and e.g. over charge rates. The higher confidence in the forward load prediction allows for example greater freedom in charging rates, whereas lower confidence may be used by a network of electric vehicle charging plan to hold back spare capacity in the network.

Such a neural network may branch dynamically where new patterns are identified or not matching prior learnings and create a new, secondary network 119, 120. The secondary network may be arranged for testing the data 123 from the primary network or to recognise a separate set of characteristics once the primary network has made an identification of a mode or event. Alternatively, the secondary network may be arranged to create and re-enforce and train a network 117, 124 when measurement of a pattern is within range of an output threshold 116 of a primary network, and then decide to undertake a 'forward-pass' classification in a series of adjacent networks 119, 120, or selectively learn and undertake a 'backwards-pass' update of weights 117, 124 within the network, when a network match is found. Weights may also be assigned as a dimensional array relating to specific modes (e.g. seasons), to ensure learning reinforces a seasonal or mode related pattern. Thus, the neural network is re-enforced and trained when an event or device has been recognised.

Such a branch or distribution of networks can both aid a mode or primary event detection, aid a risk-profile scoring of where the current pattern fits on a distribution, to aid forecast and decision logic. Thus, the adjacent neural networks may represent a distribution of patterns away from a base representing typical patterns for said event such that the outputs of the adjacent networks represents a probability (e.g. binomial) distribution of the primary network being accurate in identifying the event or mode. This can aid how the forecast is used, e.g. for example knowing how well a current situation fits with prior experience and decisions, or in a wider example such as automated financial trading, informing that such rules should not be used when the market is in an unknown or less familiar pattern.

The recurrent neural network (RNN) may make use of an Elman or Hopfield feedback topology or deep learning techniques, as well as preparing signals by filtering and signal normalising techniques such as convolutional neural network approaches for pattern recognition, de-noising and auto-decoder approaches. The networks and hidden layers may also make use of additional memory nodes to aid e.g. LSTM (Long Short Term Memory) approaches, and used of synthetic and random training on real data, central pre-processing to data-sets, to aid learning of the network or for expediting application of prepared networks for generic application at end sites where networks deploy for forward classification use, with secondary learning to adjust to local patterns. Such networks can have an advantage of re-enforcing a current temporal pattern of activity, like in speech recognition, or in aiding recognising correlated activities, for example an EV charging event starting corresponding to an arrival and occupancy of a property, corresponding to the start of additional load detections in a home for increased lighting and appliance use, or for seasonal activity where an arrival and a heating load event may be correlated. In either a branching network approach, or where networks have lots of hidden layers, different nodes may represent and learn such behaviours for modes, appliances, or correlations of modes and appliances, to further aid the prediction and forecast, and therefore the risk-profile and flexibility available.

In embodiments, the software systems and protocols, may make use of mechanisms of exchange, based around distributed ledgers, such as block-chain technologies, electronic coins or cryptography, such as energy block-chains based on the EnergyWeb approaches (themselves based on Ethereum approaches). Such approaches, whilst negating the need for an intermediary, typically require significant processing power and chains that become unwieldy. Therefore they often require a party to act as a trusted validator to confirm a trade or verify 'proof of work', or para-chain approaches such as in the Polkadot variation of splitting transactions into groups or sub-chains. Such approaches may have value in how they enable consistent and mathematically pure and long-lasting approaches for data to be exchanged, and for new forms of protocols that are independent of energy system actor, device and language, so have value within software systems described in this application as mechanisms to ensure reliable access and management over time. However, while such approaches are interesting in creating new models of grid-edge or peer-to-peer marketplace, other approaches may be beneficial for creating such local marketplaces.

Such ledger approaches may be used to help govern interactions for assets within a close community, building, site, community or low voltage network. Within these approaches, a para-chain model can be used where part of the local energy system, such as a substation or special meter, can be used for confirmation and validation of local transactions, negating the energy and data intensive issues with full distributed block-chains. An approach is also to use what are termed herein as 'mesh-chains', where ledgers or block-chains are created at stable nodes, representing an assumed level of trust, such as by smart meters, charger points, at particular locations, as well as within assets such as electric vehicles, each time they cross-over or interact with another ledger, thus each creating an audit trail of each transaction that has metered energy flow for, charge event by a charger, charge/discharge by a vehicle, with each transaction creating a shared hash and timestamp noting its interaction within the grid.

Figure 10B:
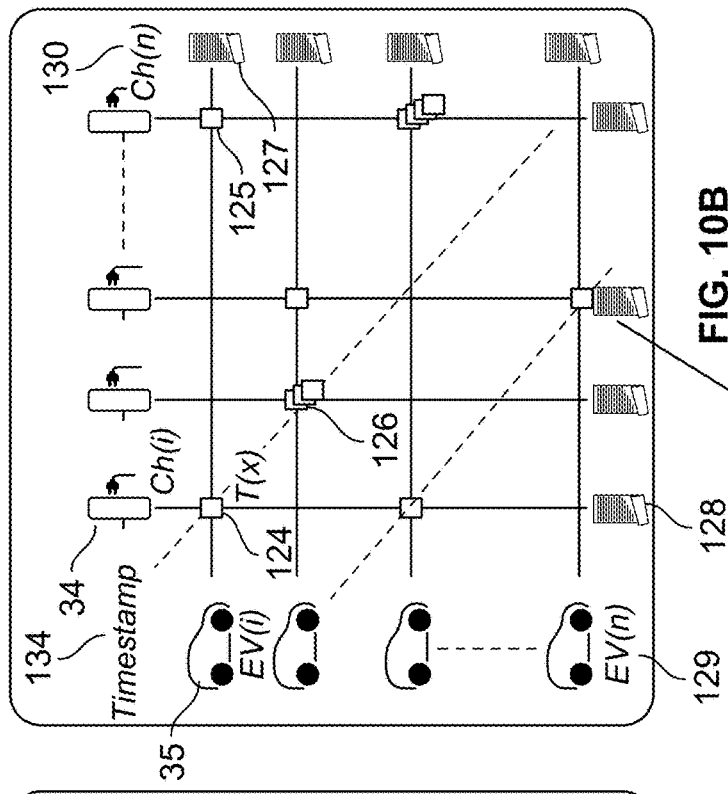
FIG. 10B—shows an example of forming an audit trail and mesh-chain across fixed and moving assets in a community.
Figure 10C:
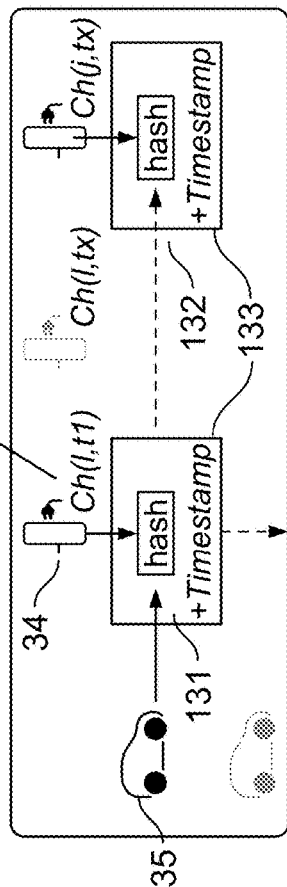
FIG. 10C shows a hash as a combination of shared public and private keys between EVs and chargers/meters.

FIG. 10B—shows an example of forming an audit trail or ledger 127 as a "mesh-chain" by recording transactions 133 each time a cross-over 124, 126 or chain-link event happens, here illustrated by an EV 35 which "transacts" to receive a charging event with a charger apparatus 34, at a particular time recorded as a time stamp 134, and illustrated as a set of electric vehicles (EV(i)-EV(n)) and a set of charger apparatus (Ch(i)-Ch(n)) at different locations, wherein each ledger for an electric vehicle (e.g. 127) and each ledger for a charger (or meter) 128 records a "transaction" 133 each time 134 there is an event, and forms as shown in FIG. 10C a hash 131 as a combination e.g. of shared public and private keys between the EV 35 and charger 34, and at a future event illustrated as an EV with another charger 132. Said ledgers 127, 128 can therefore form a historic record of transactions over time with different locational assets, to for example aid accounting of use of asset (e.g. battery) or monetization of power to (via a charger) or from stored energy in the asset.

The invention claimed is:

1. A system for managing and optimizing an energy network, the system comprising:
  a plurality of distributed end devices, wherein the plurality of distributed end devices includes a first distributed end device and a second distributed end device;
  energy resources including electric vehicle (EV) batteries and/or other energy storage batteries;
  a hardware processor; and
  a memory coupled with the hardware processor, wherein the memory is configured to provide the hardware processor with instructions which when executed cause the hardware processor to:
    receive data and monitor usage of the plurality of distributed end devices and the energy resources at plural remote sites in an energy network, wherein the hardware processor and the plurality of distributed end devices and energy resources are configured to exchange data via a communication network;
    process external data and market signals;
    manage energy usage of the energy resources responsive to predictions of energy usage, comprising to:
      input into a model a time series of measurements indicative of energy usage or activity in the system, wherein the model is a recurrent neural network, wherein the recurrent neural network is trained based on real data, wherein for the first distributed end device, the time series of measures is input into a first model, wherein for the second distributed end device, the time series of measures is input into a second model, and wherein the first model is different from the second model:
      identify, based on the model, a time or occupancy dependent mode of use of the system;

output a scaler real-time value representing one or more properties associated with the mode of use, being one or more of the device or mode type, start-time of the event or mode, time and power load duration expectation, wherein the outputting of the scaler real-time value comprises to:
  validate the scaler real-time value using the recurrent neural network; and
calculate flexibility in the energy network over a time period based at least in part on the scalar value; and
coordinate how the flexibility in the energy resources, can be scheduled, shared or orchestrated to determine a battery charging plan for charging and/or discharging batteries at the remote sites that delivers an identified amount of flexibility to the energy network.

2. The system of claim 1, wherein the end devices at remote sites are arranged to control charging in accordance with their respective charging plans, wherein the end devices implement a charging protocol configured to respond to an identified local constraint, congestion or local limit, to optimize energy transmission on a local network, in such a manner as the aggregate stochastic and network performance is predictable and beneficial.

3. The system of claim 2, wherein the charging protocol proceeds by:
  a) beginning charging or discharging at an initial rate;
  b) periodically incrementing the rate towards a target rate according to the charging plan for the rechargeable battery;
  c) detecting an indication of a local limit being reached on the network and in response reducing the rate,
  and continuing steps b and c to charge and/or discharge the battery according to the plan.

4. The system of claim 3, wherein the increments to the charging rate are additive, and the reductions to the charging rate are multiplicative.

5. The system of claim 3, wherein the indication of a local limit being reached on the network is determined by monitoring a voltage level or frequency on the distribution network or a change in voltage level or frequency, where the limit can be an upper or lower limit for the network to operate within predetermined acceptable conditions.

6. The system of claim 2, the aggregate of distributed charging profiles or device charge plans responding in a predictable fashion, provides a distributed self-regulation effect to aid the overall predictability, fairness, stability or goal of the system.

7. The system of claim 1, wherein a battery charging plan for charging and/or discharging batteries at the remote sites is dynamically adjusted based on processing signals indicative of one or more of:
  market and tariff signals, weather data, location constraints;
  local measurements of energy supply; and
  energy use by the building or vehicle.

8. The system of claim 1, wherein the hardware processor is further configured to:
  monitor end electric vehicle (EV) status and battery charging status at remote sites;
  predict forward use and charging patterns of electric vehicles at remote sites, and local network performance;
  form an aggregate model of EV use and network performance across a local network using such measurements and forward predictions, and compare the aggregate model of EV use and network performance to identify a potential issue on the local network where predicted use would exceed the local constraint;
  evaluate and schedule a real time adjustment to an EV charging plan to throttle charge rates avoid exceeding the local constraint; and
  communicate the adjusted charging plan to the remote EVs.

9. The system of claim 8, wherein the local constraint is a consumer and utility supply constraint in time shifting energy use and/or coupled with local network constraints of managing a set of resources within the local network to avoid constraints imposed by the infrastructure of the local network.

10. The system of claim 9, wherein available flexibility and risk profiles from end site resources are used to defer charging.

11. The system of claim 9, wherein the prediction is based at least in part on tracking EV vehicle location.

12. The system of claim 1, wherein the hardware processor is further configured to optimize behind-the-meter (BTM) benefits by the system, wherein the hardware processor processes real-time or periodic data from end devices to manage flexibility delivered by charging/discharging distributed energy storage resources by:
  a) analyzing data sources including one or more of i) energy use, ii) local solar production, iii) weather forecast data iv) calendar information, past performance and learnt behavior v) tariff profile information vi) customer preferences,
  b) perform algorithmic approaches to make data-driven predictions of energy use including one or more of i) predicted load ii) solar generation iii) EV charge usage iv) battery charge plan v) risk profiles and flexibility, and
  c) using the data driven predictions to produce a charge plan for a storage resource to produce a desired goal.

13. The system of claim 12, wherein the goal is one or more of i) minimizing energy use from the grid ii) maximizing self-consumption of solar resources iii) minimizing price iv) minimizing $CO_2$ v) optimizing battery performance, vi) managing state of charge and battery performance vii) achieving a charging goal for battery readiness at a certain time, viii) responding to a change request or flexibility opportunity from a third party, ix) providing capacity to respond to flexibility opportunities.

14. The system of claim 12, arranged to provide status and performance reporting to a user based on the data and predictions.

15. The system of claim 12, wherein the hardware processor is further configured to use linear programming techniques between a set of data and variables at a start of a time interval, and a predicted set at a further time period to focus an optimization between maximizing a goal within the time interval and how by varying a battery charge rate/discharge parameter in a household battery or electric vehicle charging plan, a local optimization could occur for the predicted time interval.

16. The system of claim 12, wherein the hardware processor is further configured to use the recurrent neural network to maximize an entropy function and/or find Nash equilibrium approaches to optimize a goal and/or balance conflicting demands within a specific time interval.

17. The system of claim 1, wherein data is shared with a prediction engine and an economic model to determine a charging plan for a battery,
  wherein said economic model calculates an impact of an example plan with reference to a tariff model or store;

and the prediction engine
  i) calculates a forward model of consumption and generation for applying such a plan, and ii) stores the prediction to enable performance monitoring and feedback to the system or requests for new predictions if there is divergence of measured variables from the forecast, and iii) manages the storage and deployment of the plan to ensure end assets perform in accordance with the plan objectives.

18. The system of claim 1, wherein the hardware processor processes real-time or periodic data across a plurality of end devices within a particular location to manage an aggregate performance of energy storage resources within at least one identified local constraint, wherein the hardware processor is configured to:
  monitor multiple end site devices and resources for usage, supply and charging rate and receive prediction forecasts, risk profiles and available flexibility and spare capacity from end sites and on a local network;
  aggregate site usage and forecasts to model the predicted overall load forecast, demand and flows across the location or low voltage network;
  analyze how such forecasts could impact local network performance in view of at least one network constraint;
  make or schedule adjustments to local active management plans, central or distributed battery resources and EV charging, solar curtailment, heat-resources, and other demand side response assets in order that energy usage in the network meets the constraint; and
  enact active management controls to implement the plans.

19. The system according to claim 18, wherein the network constraint is one or more of:
  i) power quality issues including one or more of the following: voltage rise or drop, limits on different phases, network faults, or power quality issues, and
  ii) deployment of an additional loads or generation means on the network, wherein the additional loads or the generation means include electric vehicle charging, heat-pumps, electrification of heating, solar/EV export to grid, leading to assets running at higher stresses or increasing fault rate and increasing the challenge of managing the grid.

20. A method of management and optimization in an energy network comprising software systems and protocols, connectivity and exchange means to and between distributed end devices and energy resources, the method comprising:
  receiving data and monitoring usage of a plurality of distributed end devices and energy resources at plural remote sites in an energy network, wherein the energy resources include electric vehicle (EV) batteries and/or other energy storage batteries, and wherein a processor and the plurality of distributed end devices and energy resources are configured to exchange data via a communication network, wherein the plurality of distributed end devices includes a first distributed end device and a second distributed end device;
  processing external data and market signals;
  managing energy usage of the energy resources responsive to predictions of energy usage, comprising:
    inputting into a model a time series of measurements indicative of energy usage or activity in the system, wherein the model is a recurrent neural network, wherein the recurrent neural network is trained based on real data, wherein for the first distributed end device, the time series of measures is input into a first model, wherein for the second distributed end device, the time series of measures is input into a second model, and wherein the first model is different from the second model;
    identifying, based on the model, a time or occupancy dependent mode of use of the system;
    outputting a scaler real-time value representing one or more properties associated with the mode of use, being one or more of the device or mode type, start-time of the event or mode, time and power load duration expectation, wherein the outputting of the scaler real-time value comprises:
      validating the scaler real-time value using the recurrent neural network; and
    calculating flexibility in the energy network over a time period based at least in part on the scalar value; and
  coordinating how the flexibility in the energy resources, can be scheduled, shared or orchestrated to determine a battery charging plan for charging and/or discharging batteries at the remote sites that delivers an identified amount of flexibility to the energy network.

* * * * *